though; United States Patent [19]

Yoo

[11] 3,917,737
[45] Nov. 4, 1975

[54] CATALYTIC HYDROGENATION PROCESS
[75] Inventor: Jin Sun Yoo, South Holland, Ill.
[73] Assignee: Atlantic Richfield Company, Philadelphia, Pa.
[22] Filed: Sept. 28, 1972
[21] Appl. No.: 293,002

Related U.S. Application Data
[63] Continuation-in-part of Ser. No. 53,677, July 9, 1970, abandoned.

[52] U.S. Cl. ... 260/683.9; 260/666 R; 260/666 PY; 260/667; 260/677 H
[51] Int. Cl. .............................................. C07c 5/02
[58] Field of Search ..... 260/683.9, 666, 667, 677 H

[56] References Cited
UNITED STATES PATENTS
3,439,054  4/1969  Kroll .................................. 260/666
3,591,649  7/1971  Kroll .................................. 260/667
3,591,656  7/1971  Kroll .............................. 260/683.9

Primary Examiner—Veronica O'Keefe
Attorney, Agent, or Firm—Thomas J. Clough

[57] ABSTRACT

Novel hydrogenation reactions using as catalysts a composition containing:
 A iron, nickel or cobalt,
 B organometallic reducing agent, and
 C acidic, solid, silica-based and inorganic oxide support and, optionally,
 D an electron donor ligand of a Group V-A element, are disclosed. More particularly, the hydrogenation of carbon-to-carbon unsaturation, particularly non-aromatic carbon-to-carbon unsaturation, at mild reaction conditions is accomplished. Novel catalysts comprising components (A), (B) and (C) are also disclosed.

22 Claims, No Drawings

CATALYTIC HYDROGENATION PROCESS

This application is a continuation-in-part of application Ser. No. 53,677 filed Jul. 9, 1970, now abandoned.

This invention relates to novel hydrogenation catalysts and reactions. More particularly, this invention relates to the novel hydrogenation of carbon-to-carbon unsaturation in the presence of molecular hydrogen and heterogeneous catalysts comprising a complex of iron, nickel or cobalt, an organometallic reducing agent and an acidic, solid, silica-based and inorganic oxide support, and, optionally, an electron donor ligand of a Group V-A element.

Numerous and diverse catalysts have been disclosed as useful in hydrogenation reactions, particularly in the hydrogenation of carbon-to-carbon unsaturation. Both homogeneous and heterogeneous metal-containing catalysts have been disclosed as being active hydrogenation catalyst. Such prior art catalysts are disclosed, for example, in U.S. Pat. Nos. 3,205,278; 3,323,902; 3,409,681 and 3,412,174.

It has now been found that improved hydrogenation activity is obtained in a hydrogenation process by the use of a catalyst comprising a minor catalytically effective amount of a complex of A. a metal selected from iron, cobalt, nickel and mixtures thereof, and B. an organometallic reducing agent of the formula $M(R)_n$ wherein M is a Group IA, IIA, IIB, IIIA or IVA metal, n is 1 to 4 and satisfies the valence of M, and each R is selected from hydrogen and hydrocarbyl, provided at least one R is hydrocarbyl; supported on a major portion of C. an acidic, solid, silica-based and inorganic oxide material wherein the mole ratio of (B) to (A) is from about 5 to 20:1 and the complex is prepared by the interaction of (A) and (B) at a temperature of from about −20°F. to about 150°F. and, optionally, D. an electron donor ligand of a Group V-A element. More particularly, it has been found that the use of such catalyst provides enhanced hydrogenation activity in a process for the catalytic hydrogenation of hydrogenateable material having carbon-to-carbon unsaturation wherein said material is contacted under hydrogenation conditions with molecular hydrogen in the presence of such catalyst.

A factor in the level of hydrogenation activity of the catalyst is the molar ratio of iron, cobalt or nickel to the organometallic reducing agent. The amounts of these materials should be such as to provide about 5 to 30 or more, preferably about 6 to 10, moles of the organometallic component per mole of the iron, cobalt or nickel. The total iron, cobalt or nickel and organometallic reducing agent in the catalyst is a minor, catalytically-effective amount with the major weight proportion of the catalyst being the solid, acidic support. For example, the weight ratio of acidic, solid, silica-based and inorganic oxide material to iron, cobalt or nickel may be about 2 to 2000:1, more advantageously in the range of from about 5 to 600:1 and preferably from about 10 to 300:1.

The preferred types of catalysts useful in hydrogenation of carbon-to-carbon unsaturation are those wherein the iron, cobalt or nickel is supplied as a chelate with a weak field ligand, the organometallic compound is an organoaluminum compound, the acidic, solid silica-based and inorganic oxide support material is a calcined base containing silica-alumina and a separate alumina phase, and, if present, the electron donor ligand is a tertiary mono- or diphosphine such as tributyl phosphine, triphenyl phosphine or bis(diphenylphosphino)ethane or a nitrogeneous ligand such as dipyridyl. The catalysts are heterogeneous, i.e., solid phase, and useful in both fixed bed and slurry forms.

The complex of (A) and (B) is prepared at a temperature of from about −20°F. to about 150°F., more preferably from about 0° to 100°F., and still more preferably, 20° to about 80°F. It has been found that the combining of components (A) and (B) within the temperature range as set forth above, provides an active hydrogenation catalyst exhibiting increased hydrogenation activity. The above temperature range set forth for the preparation of (A) and (B) refers to the preparation of the active complex prior to use in the hydrogenation process. For example, component (B) can be interacted with (A) optionally in the presence of (D) and optionally in the presence of the support (C). In addition, component (A) can be interacted with (C) or (D) at varying temperatures followed by interaction with (B) within the above temperature range. Thus, it is important that when (B) is interacted with (A) to form the complex, that such temperature of interaction and ultimate formation of the final supported complex be within the temperature range of from about −20° to about 150°F. The supported catalyst of this invention can then be subjected to hydrogenation process conditions. The molar ratio of optional electron donor ligand to iron, cobalt or nickel is often about 0.5 to 15:1, preferably from 1 to 5:1.

The iron, cobalt or nickel can be supplied to the catalyst by compounds of the metals which are at least partially soluble in a solvent wherein the organometallic compounds and the electron donor ligand, if used, are also at least partially soluble. Exemplary of such metal sources are inorganic salts such as, for example, the halides, e.g. $FeCl_3$, $FeBr_3$, $FeBr_2$, $FeI_3$, $CoCl_3$, $CoBr_2$, $CoI_2$, $NiCl_2$ or $NiBr_3$; or organic compounds such as di- and trihydrocarbyloxy metal compounds of the formula $(RO)_nM$, wherein n is 2 to 3 and satisfies the valence of M, M is iron, cobalt or nickel and each R is alkyl, aryl, aralkyl and like groups, say, having up to about 20 carbons atoms, more preferably from 1 to about 8 carbons atoms, and mixtures thereof, formed, for example, from carbinols such as methanol, ethanol, butanol, hexanol, 2-ethylhexanol, octanol, decanol, lauryl alcohol, stearyl alcohol, $C_{25}H_{51}OH$ isomers, cyclohexanol, benzylalcohol, and phenols and naphthols such as phenol, cresols, xylenols, resorcinol, α-naphthol or β-naphthol; hydrocarbyloxy metal carboxylates such as $(RO)_2CoOOCR'$, $(RO)_2FeOOCR'$ and $(RO)_2NiOOCR'$ wherein R and R′ can be as defined above for R; di- and triphosphine complexes such as, $Fe[(C_6H_5)_2PC_2H_4P(C_6H_5)_2]X_2$, $Co[((C_6H_5)_2PC_2H_4P(C_6H_5)_2]X_2$ and $Ni[((C_6H_5)_2PC_2H_4P(C_6H_5)_2]X_2$ wherein X is a halide. Also available as metal sources are chelates formed by iron, cobalt or nickel and weak field ligands such as β-diketones or β-ketocarboxylic acids, esters and salts thereof having from about 5 to about 16 carbons atoms. Examples of these types of metal sources include β-diketonato cobalt (II) and (III), β-diketonato iron (II) and (III), acetylacetonato cobalt (II) and (III), acetylacetonato iron (II) and (III), propionylacetonato cobalt (II) and (III), propionylacetonato iron (II) and (III), and benzoylacetonato iron (II) and (III), β-diketonato nickel (II) and (III), acetylacetonato nickel (II) and (III), propionylacetonato nickel (II) and (III) and benzoylacetonato nickel (II) and (III); chelates from β-ketocarboxylic acids. Also, the metal salts of saturated monocarboxylic acids such as formic, acetic, propionic, n-butyric, isobutyric, hexanoic, valeric, caproic, isovaleric, stearic and palmitic acids; the metal salts of the corresponding unsaturated monocarboxylic acids such as acrylic, methacrylic, oleic and like acids; metal salts of saturated dicarboxylic acids such as oxalic, succinic, malonic, adipic, glutaric, 1,10-decane dicarboxylic and like acids; metal salts of corresponding unsaturated dicarboxylic acids such as muconic and like acids; the metal salts of cyclic and aromatic acids such as benzoic, naphthoic, phthalic, isophthalic, terephthalic, phenylacetic, cinnamic and like acids; and metal salts of dialkoxy carboxylates such as dimethoxy acetic acid. The various metal salts of carboxylic acids set forth above, in general, contain up to about 26 carbons atoms, more preferably up to about 8 carbon atoms. The preferred sources of iron, cobalt and nickel are halides and acetylacetonates and high molecular weight homologs and analogs thereof. Furthermore, organometallic compounds having 1 to about 10 carbon atoms are preferred. Among the three metals, nickel generally provides the most active hydrogenation catalysts.

The organometallic compounds which function to reduce the valence state of the iron, cobalt or nickel useful in making the catalyst of this invention are those of the formula $M(R)_n$ wherein M is a metal selected from those of Groups IA, IIA, IIB, IIIA and IVA, each R is hydrogen or an essentially hydrocarbyl radical of from 1 to about 20 carbons atoms, preferably devoid of olefinic and acetylenic unsaturation, provided, however, that at least one R group is hydrocarbyl. Typical examples of hydrocarbyl groups represented by R are alkyl groups of from 2 to about 20 carbon atoms, e.g., ethyl, propyl, isopropyl, butyl, isobutyl, t-butyl pentyl, hexyl, heptyl, octyl, decyl, dodecyl, octadecyl, etc.; cycloalkyl groups of from 3 to about 20 carbon atoms, e.g. cyclopropyl, cyclopentyl, cyclohexyl, cyclooctyl, cyclodecyl, cyclooctadecyl, etc.; aryl groups of 6 to about 20 carbon atoms, e.g. phenyl, naphthyl, biphenyl, phenanthryl, etc.; alkaryl groups of from 7 to about 20 carbon atoms, e.g. benzyl phenethyl, phenhexyl, etc. and n is an integer from 1 to 4 and satisfies the valence of M. Exemplary of the metals contemplated herein are: lithium, sodium beryllium, magnesium, zinc, mercury, aluminum, silicon, boron, tin and lead. The preferred metals represented by M are lithium, magnesium, zinc, boron and aluminum. Of these metals, aluminum is the preferred metal in the reducing agents. Also, the hydrocarbyl group is most preferably an alkyl of 2 to about 8 carbons atoms and at least one of the R groups must be hydrocarbyl, preferably at least two when the valence of the metal is at least 2. The preferred R groups are those groups which contain β-hydrogen, e.g. at least two aliphatic carbon atoms linked directly to M. Typical examples of the preferred R group are alkyl, cycloalkyl and alkaryl. It is further preferred that these groups contain from 2 to about 8 carbon atoms. It has been found that the catalysts prepared from reducing agents having the preferred R groups, e.g. the presence β-hydrogen, exhibit enhanced hydrogenation activity. Trialkyl aluminum and dialkyl aluminum hydride compounds have been found particularly advantageous. Exemplary of these preferred reducing agents are triethyl aluminum, tri-n-propyl aluminum, triisopropyl aluminum, tri-n-butyl aluminum, triisobutyl aluminum, trihexyl aluminum diethyl aluminum hydride and diisobutyl aluminum hydride. The organomettalic reducing agents also include the corresponding lithium, sodium, magnesium, beryllium, boron, mercury, zinc, silicon, tin and lead compounds. The reducing agent must be compatible with the other components of the catalyst system and is capable of reducing the iron, cobalt or nickel to an oxidation state of less than 2, preferably to a zero oxidation state.

The electron donor ligand components of the catalysts of this invention can be hydrocarbon-substituted organophosphines, particularly tertiary monophosphines of the formula $(R)_3P$, where R is hydrocarbyl of 1 to about 20 carbon atoms, optionally substituted with nondeleterious groups and preferably free from olefinic and acetylenic unsaturation. Preferred R groups are selected from alkyl, cycloalkyl, aryl, alkaryl, and aralkyl groups of up to about 20 carbon atoms. Exemplary of such groups are ethyl, isobutyl, hexyl, decyl, octadecyl, cyclohexyl, phenyl, naphthyl, tolyl and benzyl. Trialkyl and triaryl phosphines such as tributyl and triphenyl phosphines have been found particularly advantageous. Other phosphorus containing compounds such as $P(OR)_3$, e.g., $P(OC_6H_4C_6H_5)_3$ or tertiary diphosphines of the type $R_2R(C_nH_{2n})PR_2$ and $R_2PCH=CHPR_2$, wherein R is defined as above and n is 1 to 4, are useful. Also, other hydrocarbon-substituted electron donor ligands of Group V-A elements comparable or corresponding to those described above regarding phosphorus are useful; exemplary of those electron donor ligands are tertiary mono- and diarsines, stibines and bismuthines. Further exemplary of Group V-A electron donor ligands useful are alkyl and aryl phosphites and phosphine oxides; phosphorus and organophosphorus halides; nitrogenous chelate ligands, e.g., 2,2'-dipyridyl, ethylenediamine, pyridine, 1,10-phenantroline, 8-aminoquinone, Schiff base ligands and ligands containing both phosphine and amine portions, e.g. diethylaminoethyldiphenyl phosphine, bis (diethylaminoethyl) phenyl phosphine and the like. The preferred electron donor ligands and their general relative effectiveness follow: $(Aryl)_2P(CH_2)_nP(Aryl)_2 < (Aryl)_3P \leqslant (Alkyl)_3P <$ dipyridyl when employed in the catalyst, the molar ratio of electron donor ligand to iron, nickel or cobalt is often about 0.5 to 15:1, preferably about 1 to 5:1.

The solid silica-based and inorganic oxide materials useful as supports have acidic properties, e.g. they have a D + L activity of at least about 20, preferably at least about 30, when determined according to the method of Birkhimer et al., "A Bench Scale Test Method for Evaluating Cracking Catalysts," Proceedings of the American Petroleum Institute, Division of Refining, Vol. 27 (III), page 90 (1947), hereinafter referred to as Cat A. The silica-based and inorganic oxide support preferably has a substantial surface area as determined by the BET nitrogen absorption procedure (JACS, Vol. 60, pp. 309 et seq, 1938). The surface area of the support can be at least about 50 meters per gram, and such surface area are often up to about 500 or more m²/gm., preferably about 150 to 400 m²/gm. It is preferred that the catalyst support be relatively dry to avoid undue reaction with and loss of catalytic promoting materials. Thus it is advantageous that the support be calcined, e.g., at temperatures of about 600° to 1500°F. or more, to reduce the water content, but such calcination should not be so severe that the support is no longer catalytically-active.

The support component contains an inorganic oxide in addition to a silica-based material which, when combined with silica, provides an acidic material as in, for instance, the case of silica-alumina. Often these materials are one or more oxides of metals of Groups II, III and IV of the Periodic Table. Examples of the composites contemplated herein under the generic designation of silica-based and inorganic oxide material are often composed predominantly of, or even to a major extent of, silica. These supports include, for example, silica-alumina, silica-boria, silica-zirconia, silica-magnesia, silica-aluminazirconia, silica-alumina-thoria, silica-alumina-magnesia, and the like. The silica-based material can contain amorphous and/or crystalline material such as a crystalline aluminosilicate, for instance, having pore openings of diameters in the 6 to 15 Angstrom unit range. The support often contains silica and alumina and such supports, whether naturally-occurring as an acid-treated clays, or a synthetic gel, will frequently contain about 10 to 60, preferably about 15 to 45, weight percent alumina. In addition, such silica-alumina supports can, and preferably do, contain a portion of the alumina as a separate, distinct phase.

A highly preferred catalyst support can be made by combining a silica-alumina hydrogel with a hydrous alumina with or without (preferably without) a crystalline aluminosilicate. An advantageous hydrous alumina component is, when analyzed by X-ray diffraction of dry samples, either one or a mixture of amorphous hydrous alumina and a monohydrate, e.g., boehmite, of say less than about 50 A, preferably less than about 40 A, crystallite size as determined by half-width measurements of the (0, 4, 1) X-ray diffraction line calculated by the DebyeScherrer equation. The mixture of the catalyst precursor components can be dried, e.g., at about 220° to 500°F., to convert the silica-alumina hydrogel to xerogel form. The dried material can then be calcined, e.g., at a temperature of about 700° to 1500°F., preferably about 800° to 1400°F., to provide the active catalyst support. During calcination, the separate hydrous alumina phase of the mixture is converted to a gamma form or other catalytically-active alumina.

In providing the preferred catalyst support precursor for drying, the components can be combined in any suitable manner or order desired, and advantageously each of the components is in the mixture in finely-divided form, preferably the particles are principally less than about 300 in size. The finely-divided material can have an average particle size of about 10 to 150 microns and can be used to make a catalyst of this particle size which can be employed in a fluidized bed type of operation. However, if desired, the mixture of catalyst support components can be placed in macrosize form, that is, made into particles as by tabletting, extruding, etc., to sizes on the order of about 1/64 inch to ½ inch or more in diameter and about 1/32 inch to 1 inch or more in length, before or after drying or calcination. If formation of the macrosize particles is subsequent to calcination and the calcined particles have been contacted with water, the material can be recalcined.

On a dry basis, the preferred supports of the catalysts of the present invention contain about 45 to 95 weight percent of the amorphous silica-alumina xerogel, about 5 to 55 weight percent of the separately added alumina phase, and about 0 to 50 weight percent of the crystalline aluminosilicate, preferably the proportions of these ingredients are about 75 to 90%, about 10 to 25% and about 0 to 20%, respectively. If present, the crystalline aluminosilicate is usually at least about 1 weight percent, preferably at least about 5 weight percent, based on the dried support. The alumina content from the silica-alumina xerogel and the separate alumina phase is about 20 to 70 weight percent, preferably about 25 to 60 weight percent, based on the dried support. Also, the catalyst support generally contains less than about 1.5 weight percent, preferably less than about 0.5 weight percent, sodium.

The silica-alumina component of the precrusor of the preferred catalyst support of the present invention can be a silica-alumina hydrogel which contains about 55 to 90, preferably 65 to 75, weight percent silica and about 10 to 45, preferably about 25 to 35, weight percent alumina, on a dry basis. The silica-alumina can be naturally-occurring or can be synthetically prepared by any desired method and several procedures are known in the art. For instance, an amorphous silica-alumina hydrogel can be prepared by co-precipitation or sequential precipitation by either component being the initial material with at least the principal part of the silica or alumina being made in the presence of the other. Generally the alumina is precipitated in the presence of a silica gel. It is preferred that the silicaalumina hydrogel be made by forming a silica hydrogel by precipitation from an alkali metal silicate solution and an acid such as sulfuric acid. Then alum solution may be added to the silica hydrogel slurry. The alumina is then precipitated by raising the pH into the alkaline range by the addiition of an aqueous sodium aluminate solution or by the addition of a base such as ammonium hydroxide. Other techniques for preparing the silicaalumina hydrogel are well known in the art, and these techniques may be used in the practice of the invention.

The alumina hydrogel which can be combined with the silica-alumina is made separately from the silica-alumina. The alumina hydrogel may be prepared, for example, by precipitation of alumina at alkaline pH by mixing alum with sodium aluminate in an aqueous solution or with a base such as soda ash, ammonia, etc. As noted above, the alumina hydrogel can be in the form of amorphous hydrous alumina or alumina monohydrate, e.g., of up to about 50 crystalline size as determined by X-ray diffraction analysis. The amorphous hydrous alumina generally contains as much combined water as does an alumina monohydrate. Mixtures of the monohydrate and amorphous forms of hydrous alumina are preferred and often this phase is composed of at least about 25% of each of the separate members.

In preparing the catalyst support, the silica-alumina hydrogel and the hydrous alumina may be separately filtered and intimately mixed, for instance, by colloidal milling. Although in this particular procedure a low sodium crystalline aluminosilate can be added after the milling, this ingredient can also be combined before the colloidal milling operation. The mixture is dried, water washed to acceptable concentrations of, for instance, sodium, and redried in the preferred procedure. The drying, especially the initial drying, is advantageously effected by spray drying to give microspheres.

The crystalline alumminosilicate which can be present in the catalyst support of the present invention, can have pore openings of 6 to 15 A in diameter, and preferably the pore openings have a diameter of 10 to 14 A. Usually, with a given material, the pores are relatively uniform in size and often the crystalline aluminosilicate particles are primarily less than about 15 microns in size, preferably less than about 10 microns. In the crystalline aluminosilicate the silica-to-alumina mole ratio is often greater than about 2:1 and is usually not above about 12:1, preferably being about 4 to 6:1. The aluminosilicate may be available in the sodium form, and the sodium can be removed before or after the crystalline aluminosilicate is added to the other catalyst support ingredients.

It is preferred to exchange the sodium with ammonium ions, for instance, through contact with an aqueous solution of ammonium chloride or another water-soluble ammonium compound. Subsequently, during drying and/or calcination, the ammonium ion may break down to release ammonia and leave an acid site on the aluminosilicate. On a molar basis, the ammonium or hydrogen ion is usually at least about 10% or even at least about 50% based on the alumina content of the crystalline aluminosilicate. Suitable replacements for the sodium also include the polyvalent metals of the periodic chart, including the Group II-A and rare earth metals such as cerium, etc. The metals may be present along with the ammonium or hydrogen cations.

The order in which components are combined to prepare the supported catalysts of the present invention can be varied as previously noted. The catalysts can be conveniently prepared by impregnating the acidic, silica-based and inorganic support material with a solution of the metal component, e.g., iron, cobalt or nickel acetylacetonate, in a solvent, e.g., methanol. The metal impregnated support after solvent removal is then optionally contacted with a solution of the electron donor ligand eomponent, e.g., tri-n-butylphosphine, if the ternary form of the catalyst is being prepared, and then with a solution of organoaluminum component. If the ternary catalyst is not to be prepared, the treatment with a solution of the electron donor ligand is omitted. The catalysts prepared herein have the acidic, solid, silica and inorganic oxide material as a compǫnent and are thus useful both in dry form or in a liquid solvent phase. Although the foregoing are advantageous methods for preparing the catalysts of this invention, other orders of addition of components are possible. As previously noted, complexes of the metal source and the organoaluminum compound, with or without the ligand, may be prepared in solution before impregnation of the silica-based material. Suitable solvents useful in such a preparation are inert, organic solvents, i.e. inert to both the catalyst components and the reactants to be hydrogenated. Exemplary are aromatic and aliphatic hydrocarbons. The catalyst is prepared by the interaction of the components at temperatures of from about −20°F. to about 150°F., more preferably from about 0°F. to about 100°F., and still more preferably from about 20°F. to about 80°F. As stated previously, the interaction of components (A) and (B) within the above temperature ranges refers to the formation of the complex prior to use in the hydrogenation process. Thus, (A) can be interacted optionally with (D) and (C) at varying temperatures However, it is important that the interaction of (B) with (A) and the ultimate formation of the final supported complex catalyst be within the above temperature ranges and that the complex supported catalyst be maintained within the above temperature range prior to use in the hydrogenation process of this invention. It has been found that the above temperature ranges which are utilized for the preparation of the complex provides a total catalyst exhibiting enhanced hydrogenation activity. Thus, higher temperatures can lead to catalyst deactivation. The mixing of the catalyst components may generally be accomplished at ambient temperatures and pressures.

For example, formation of the ligand-metal complex may be effected by simply mixing the reactants in the presence of a suitable solvent for the complexing reaction. The mixing can be done at room temperature or up to as high as about 300°F. The complex usually forms within about 30 to 120 minutes. Suitable solvents for the complex-forming reaction include the same solvents which are suitable for use in the complex containing the reducing agent. If desired, however, the complexing may be accomplished in a solvent which is unsuitable for use in the latter composition; in this case, the resultant complex will first be isolated from the reaction mixture and re-dissolved or re-suspended in a proper solvent which is inert to the final complex containing the reducing agent.

Thus, for example, one method of preparing a phosphineiron, nickel or cobalt complex can involve stirring or refluxing, preferably at elevated temperature, a mixture of bis(diphenylphosphino)ethane, ferric acetylacetonate and benzene or toluene. After the complex has been formed there may then be added directly to the reaction mixture the reducing agent at a temperature of from about −20°F. to about 150°F. In another method, the complex may be prepared by refluxing an alcohol, e.g., ethanol, solution of the phosphine, bis(diphenylphosphino)ethane, and cobalt acetylacetonate, preferably at a temperature of about 150° to 250°F., and isolating the resultant complex from the reactant mixture. The isolated complex can then be dissolved or suspended in a suitable inert solvent, e.g., toluene, and the reducing agent added thereto at a temperature of from about −20°F. to about 150°F. to form a ternary complex useful to impregnate the support and form a catalyst useful in the present invention. The addition to the complex solution of the reducing agent is preferably conducted in a dry-inert atmosphere (argon or nitrogen), out of the presence of air, for instance in an autoclave. Within a relatively short period of time after the admixing of the components, e.g., about 5 to 15 minutes, the ternary complex, preferably as a colloidal precipitate, suitable for impregnating the silica-based supports of this invention is formed.

The catalysts described herein exhibit high activity under mild conditions for the hydrogenation of hydrogenateable organic materials having carbon-to-carbon unsaturation such as acyclic monoolefins and polyolefins, cyclic monoolefins and polyolefins, acetylenically unsaturated compounds, aromatic compounds and mixtures thereof such as are prevalent in the petroleum refining industry. In the hydrogenations of this invention, the hydrogen-to-carbon ratio of the unsaturated feeds is increased. Feeds containing carbon-to-carbon unsaturation may be unsubstituted or substituted with additional non-reactive functional groups such as halogens, either linkages or cyano groups. Exemplary of the types of carbon-to-carbon unsaturated essentially hydrocarbon compounds useful herein are the following hydrocarbons of 2 to about 30 carbon atoms: olefinic compounds selected from acyclic and cyclic mono-, di- and triolefins of from 2 to about 30 carbon atoms, acetylenically unsaturated compounds of 2 to about 30 carbon atoms and aromatic and hydrocarbyl substituted aromatic compounds of from 6 to about 30 carbon atoms. Exemplary are ethylene, butenes, pentenes, hexenes, octenes, isoprene, nonenes, cyclohexene, cyclopentadienes, cyclodecadienes, cyclodecenes, cyclododecatrienes, norbornylenes, styrene, α-alkyl styrenes, ρ-alkyl styrenes, vinyl cyclohexenes, acetylene, hexynes, octynes, phenylacetylene, benzene, toluene, xylenes, mesitylene, 1,2-diphenyl acetylene, durene, isopropyl naphthylene and anthracene. Also, hydrocarbons substituted with substantially inert non-hydrocarbyl groups such as chloroprene, vinyl bromine, ρ-chlorostyrene, allyl bromide, allyl alcohol ethers and ρ-vinyl benzonitrile are useful. The present catalysts hydrogenate olefins in the following order of ease, terminal >> cyclic >> internal, so that polyene structures may be preferentially hydrogenerated to form products having less unsaturation. Also, terminal acetylenic unsaturation is more easily hydrogenated than internal. The catalysts also show a substantial activity regarding the hydrogenation of benzene aromatics and their hydrocarbyl-substituted derivatives. Normally, however, more severe reaction conditions such as substantially higher temperatures are necessary to effect hydrogenation of the benzene ring. Also, benzene rings having electronegative substituents such as cyano or halo groups are generally not hydrogenated to great extent. The presence of an electronegative substituent is thought to deactivate the aromatic ring toward hydrogenation. Thus, non-aromatic carbon-to-carbon unsaturation may be hydrogenated preferentially to aromatic unsaturation. Additionally, acetylenic unsaturation is generally hydrogenated preferentially to olefinic unsaturation. Also, if branching is present on a carbon atom attached to an unsaturated bond, steric hindrance reduces the hydrogenation. Thus, preferably, any branching will be at least one carbon removed from an unsaturated bond. Furthermore, catalysts containing reducing agents which are completely hydrocarbyl-substituted such as trialkyl aluminums are more active regarding hydrogenation of aromatic unsaturation while those containing hydrogen such as dialkyl aluminum hydrides are generally more active regarding the hydrogenation of nonaromatic carbon-to-carbon unsaturation.

The hydrogenation reactions herein are normally accomplished at temperatures from about −40°F. to 300°F., more preferably at from about 50°F. to about 250°F. When, for instance, non-aromatic carbon-to-carbon unsaturation is hydrogenated, the reaction temperatures are normally about −90°F. to 220°F. or more while the hydrogenation of aromatic carbon-to-carbon unsaturation is normally accomplished at about 120° to 300°F. The initial hydrogenation pressures may range up to about 3,000 pounds per square inch partial pressure, at least part of which is present due to the hydrogen, or above. More particularly, pressures up to about 2,000 psig. and preferably from about 100 to 2,000 psig. are employed. Using the active catalysts described herein numerous substrates, particularly terminal olefins, may be quantitatively hydrogenated in short periods, e.g., about 7 to 20 minutes without externally heating the system. These catalysts provide a highly exothermic system such that the temperatures after initial reaction are higher than the initial reaction temperature without any application of external heat. The final reaction temperature is thus limited by the particular choice of reactants, catalysts, hydrogen pressure, initial reaction temperature and reaction time. Generally, as noted previously, hydrogenation of aromatic carbon-to-carbon unsaturation requires substantially more drastic conditions of temperature and pressure than the hydrogenation of non-aromatic carbon-to-carbon unsaturation.

Furthermore, the results obtained herein clearly indicate that the acidic, solid, silica-based and inorganic oxide material used herein functions both as an effective supporting matrix and as a cocatalyst. The heterogeneous catalysts useful herein thus exhibit high activity for hydrogenation. Also, aged catalysts from prolonged use are easily regenerated in active form by adding a fresh portion of reducing agent to the ages catalyst. The catalysts are present in the reaction system in catalytically-effective amounts. Convenient space velocities include about 1 to 15 WHSV (weight of hydrogenateable feed per weight of catalyst per hour), preferably about 2 to 6 WHSV.

The preparation of an acidic silica-alumina support of this invention is illustrated by Examples I to III. The particular exemplified support contains a separate phase of alumina.

EXAMPLE I

An alumina hydrogel is prepared as follows:

In a tank containing 5700 gallons of water at 85° F., are dissolved 300lbs. of soda ash. When the soda ash has been dissolved, 180 gallons of a 39% concentration aqueous sodium aluminate solution are pumped into the tank in about a 15-minute period. The contents of the tank are at about 85°F. 600 gallons of aqueous aluminum sulfate of 7.8% concentration, as $Al_2O_3$, are added to the admixture over an 80-minute period with water of dilution in conjunction with, and in addition thereto, diluting the reaction mass at a rate of 25 gallons per minute.

The pH of the resulting aqueous reaction mass is adjusted to 8.0 with about 75 gallons of 39% concentration aqueous sodium aluminate solution which, while being added, is also diluted continuously with water at a rate of 35 gallons per minute over a 7-½ minute addition period. The contents of the tank are heated to about 100°F., and pumped to storage.

The precipitated, hydrated alumina is thereafter filtered on a large gel filter. The filtered product is partially purified by a one-cycle, water-wash on the filter on which it is collected. This filter is a strong vacuum type drum filter with a built-in water spray nozzle directed toward the filter drum. Material on the drum is contacted with water as the drum rotates past the nozzle. After washing, the wet alumina hydrogel is stripped from the drum. This hydrogel analyzes about 50% boehmite having a crystallite size of about 35 A, and 50% amorphous hydrous alumina as determined by X-ray diffraction on dried samples.

EXAMPLE II

A silica-alumina hydrogel is prepared by the following technique:

To a batch tank is added 4,275 gallons of water preheated to 90°F., and 865 gallons of sodium silicate solution (28.8 weight percent $SiO_2$, 40-41.5 Baume at 68°F. and $Na_2O:SiO_2$ ratio of 1:3.2) is added. The batch is stirred for 5 minutes. The concentration of the sodium silicate, as $SiO_2$, in the batch is 6.3 weight percent.

With the batch at 90°F., 302 gallons of 34.5 weight percent sulfuric acid solution at 182°F. are added over a period of 45 minutes. The gel forms about 35 minutes after acid addition is begun. Then the pH is adjusted to 8.0–8.5. The batch is agitated for ten minutes.

Then 715 gallons of alum (7.8 weight percent, as Al$_2$O$_3$) is added to the gel over a period of about 36 minutes. The batch is agitated for an additional five minutes whereupon 205 gallons of sodium aluminate solution (24.4 weight percent as Al$_2$O$_3$) diluted in 1080 gallons of water is added over a period of 17 minutes. After all the sodium aluminate is added, the pH is checked. It should be between 5.0 and 5.2. The alumina content of the silica-alumina hydrogel is 30-31%.

EXAMPLE III

The silica-alumina hydrogel product of Example II and 1740 gallons of the alumina hydrogel filter cake of Example I are mixed together for one hour. The finished batch has a pH of 5.5 to 5.6 and a temperature of about 110°F. The aqueous gel mixture is then pumped to a dewatering filter, and the filter cake from said dewatering filter and a portion of aqueous gel are blended to give a gel slurry of about 14 weight percent solids. A portion of this hydrogel mixture was slurried, as a thick flowable paste, with a "Lightnin" stirrer fitted with a cage-beater and a porpeller, for about 10 minutes to give a thorough dispersion. The product was stirred one minute at 14,500 rpm., in a Waring Blender and dried in a laboratory spray-drier. The spray-dried material was washed with water to acceptable impurity levels and dried at 230°F. The washed and dried material analyzed 0.98% SO$_4$ and less than 24 ppm. Na$_2$O. The dried material as such was used as the catalyst support, as were extruded forms thereof and tablets (pellets) having diameters of about ⅛ inch and lengths of about ⅛ to ½ inch. Before use the catalyst support was calcined in a muffle furnace by raising the temperature by 300°F. per hour until 1350°F. was reached. This temperature was then held for 3 hours. The calcined particles had a surface area of about 320 to 340 square meters per gram.

The preparation and utilization of nickel catalysts of the present invention are illustrated by the following examples. Details of reaction conditions, catalyst compositions, and product distribution are present in these Examples and are listed in Tables I to VI.

EXAMPLE IV 1.0 Milli(m) mole nickel (II) acetylacetonate and 5.0 g. extrudate pellets of Example III were charged to a 300 cc. stainless steel autoclave, along with 50 ml. toluene as solvent. After the system was purged with hydrogen for about 15 minutes, 10 ml. of a 25% solution of diisobutyl aluminum hydride (14.5 m. moles) in toluene was introduced, and the system was vigorously agitated under 130 psig. hydrogen and at 130°–136°F. for 10 minutes. Hexene-1 (50 ml.) was fed to the reactor, and then the system was pressured with hydrogen to 880 psig. Reaction was allowed to proceed at 140°–155°F. for 31 minutes. During this period, hydrogen-uptake was measured and hydrogen pressure dropped from the initial pressure, 880 psig., to 70 psig. A light brown reaction mixture with a very little amount of black precipitate was discharged from the reactor. The removed reaction mixture was treated with dilute HCl and an organic layer was separated from the aqueous portion. The product was analyzed by mass spectroscopy and about 86 % of the hexene-1 substrate had been hydrogenated to n-hexane.

The extrudate pellets left inside the reactor had become the black supported catalyst by absorbing the precipitated catalyst generated in the first run. Three runs were made with this supported catalyst. In the second run, 50 ml. of hexene-1 was charged, and the system was pressured with hydrogen up to 880 psig. Hydrogen-uptake was so rapid that the initial pressure 880 psig. dropped to 85 psig. within 12 minutes. During this reaction period, the hexene-1 substrate was almost quantitatively (99 mole %) hydrogenated. This demonstrates that the fixed bed supported catalyst was more active than the slurry-type catalyst system in toluene. The third run was immediately started with a charge of 50 ml. heptene-3. The initial hydrogen pressure of the system (870 psig.) rapidly dropped to 80 psig. within 18 minutes. About 88 mole % of the heptene-3 had been hydrogenated to n-heptane. On the fourth run, 45 ml. of cyclohexene was fed to the 2 hour aged catalyst, and hydrogen was introduced to give an 840 psig. pressure. In 30 minutes, the hydrogen uptake was still rapid to give a pressure drop from 840 to 78 psig. About 84 mole % of the cyclohexene substrate was converted to cydlohexane. Details of the results obtained in this example are listed in Tables I and II.

EXAMPLE V

The catalyst system containing 1.1 m. moles of nickel (II) acetylacetonate, 14.5 m. moles of diisobutyl aluminum hydride and 4.0 g. extrudate pellets of Example III in 60 ml. toluene, was prepared under a hydrogen atmosphere as described for the previous run. Heptene-3 (30 ml.) was injected into the reactor, and hydrogen was added to 1200 psig. Reaction was virtually completed in less than 10 minutes as indicated by the pattern of hydrogen-uptake observed in this system. About 95 mole % heptene-3 was converted to n-heptane after reaction was allowed to proceed for a 30minute period. With the resulting supported catalyst in the reactor, three consecutive runs were made. The second run was started by feeding cyslohexene (38 ml.) to the aged catalyst. Hydrogen-uptake from 1180 to 470 psig. was observed within 20 minutes. About 98 mole % of the substrate was hydrogenated to cyclohexane. In the third run, 40 ml. of 1,3-pentadiene was hydrogenated under an initial (1200 psig.) hydrogen-pressure. The feed was quantitatively hydrogenated to pentene (33 mole %) and pentane (67 mole %) in 9 minutes. This indicates that a conjugated diene is hydrogenated to the corresponding alkane in two successive steps. The fourth run was made with 1,5-cyclooctadiene (40 ml.), and all of the substrate was converted to 95.5 mole % cyclooctane and 4.5 mole % cyclooctene in 20 minutes.

EXAMPLE VI

A catalyst consisting of 1.1 m. moles of nickel (II) acetylacetonate, 15.4 m. moles of diisobutyl aluminum hydride and 4.0 g. extrudate pellets of Example III in 60 ml. toluene was used to hydrogenate 35 ml. of 4-vinyl-1-cyclohexene under 740–400 psig. hydrogen pressure and at 145°–198°F. Reaction was allowed to proceed under these conditions for 50 minutes. About 99 mole % of the feed was converted to 73 mole % ethylcyclohexane and 27 mole % ethylcyclohexene. The resulting supported catalyst from the first run was used for hydrogenation of styrene. Almost all of the styrene fed in the reactor was hydrogenated to ethylbenzene under 740–380 psig. hydrogen pressure and at 98–174°F. within 40 minutes.

EXAMPLE VII

Hexene-2 (50 ml.) was introduced to a catalyst system containing 0.97 m. mole of nickel (II) acetylacetonate, 14.5 m. moles diisobutyl aluminum hydride and 4.0 g. extrudate pellets of Example III in 60 ml. toluene in an autoclave. The substrate was allowed to react under 1200–450 psig. hydrogen pressure and at 174°–163°F. for 65 minutes. About 85 mole % of hexene-2 was hydrogenated to n-hexane during this reaction period. The second run was made by feeding butyne-1 (22 g.) to the supported catalyst resulting from the first run. The butyne-1 feed was converted in 95 mole % yield to 70 mole % butene-1 and 30 mole % n-butane. It is clear that acetylenes can be hydrogenated to the corresponding alkane with the present catalyst system.

EXAMPLE VIII

A catalyst system was prepared from 1.1 m. moles of nickel (II) acetylacetonate and 14.5 m. moles of diisobutyl aluminum hydride in 60 ml. toluene. After the system was vigorously agitated under a hydrogen atmosphere (30 psig.) at 140°–150°F. for about 10 minutes, 35 ml. of 1,3-pentadiene was introduced to the reactor, and hydrogen was added to a pressure of 750 psig. Hydrogen uptake was quite rapid; the initial pressure, 790 psig., dropped to 140 psig. within 20 minutes. The resulting system was again pressured with hydrogen to 780 psig., and reaction was allowed to proceed for another 60 minutes. A dark-brown reaction mixture was removed from the reactor. A light orange organic portion, isolated from the aqueous layer after the reaction mixture was treated with dilute HCl, was analyzed by mass spectroscopy. About 99 mole % of the feed was converted to 90 mole % n-pentane and 10 mole % pentene.

In run B, 1,5-cyclooctadiene (40 ml.) was hydrogenated in a catalyst system consisting of 1.1 m. moles of nickel (II) acetylacetonate, and 15.4 m. moles of diisobutyl aluminum hydride in 60 ml. toluene. The initial hydrogen pressure 770 psig. dropped to 150 psig. in 23 minutes, and the system was again pressured with hydrogen to 780 psig. Reaction was allowed to proceed for another 37 minutes. During this period, the pressure dropped to 140 psig. The substrate was almost quantitatively hydrogenated to 89 mole % of cyclooctane and 11% cyclooctene under these conditions.

By comparing these results obtained in Run A and B to those listed in 3rd and 4th runs in Example V, it is clear that the supported catalyst, Ni(acac)$_2$-(iBu)$_2$AlH on extrudate pellets is much more active for hydrogenation of 1,3-pentadiene and 1,5-cyclooctadiene than the unsupported catalyst, Ni(acac)$_2$-(iBu)$_2$AlH in toluene.

EXAMPLE IX

A homogeneous solution was prepared from 1.1 m. moles of nickel (II) acetylacetonate, 4.1 m. moles of tributyl phosphine and 14.5 moles of diisobutyl aluminum hydride in 60 ml. toluene. After 4.0 g. extrudate pellets from Example III was added to the solution the system was stirred for about 10 minutes. Hexene-1 (50 ml.) was introduced to the system, which was then pressured with hydrogen. Hydrogen uptake from 1200 to 490 psig. was observed in 50 minutes. A dark-brown solution was discharged from the reactor. About 94 mole % of the hexene-1 feed was hydrogenated to n-hexane.

TABLE I

| | | Catalyst Composition | | | | | | Reaction Conditions | | |
|---|---|---|---|---|---|---|---|---|---|---|
| Ex. No. | Run No. | Ni(acac)$_2$, m. moles | (iBu)$_2$AlH m. moles | —CH$_3$ ml. | Solid Support of Example III g. | Bu$_3$P m. moles | Catalyst Aging Hours | Pressure psig | Temp. °F. | Reaction Time Min. |
| IV | 1st | 1.0 | 14.5 | 60 | 5.0 | — | — | 880–70 | 140–155 | 31 |
| | 2nd | 1.0 | 14.5 | — | 5.0 | — | 1 | 880–85 | 139–156 | 12 |
| | 3rd | 1.0 | 14.5 | — | 5.0 | — | 1½ | 870–80 | 144–157 | 18 |
| | 4th | 1.0 | 14.5 | — | 5.0 | — | 2 | 840–78 | 137–147 | 30 |
| V | 1st | 1.1 | 14.5 | 60 | 4.0 | — | — | 1200–700 | 150–172 | 30 |
| | 2nd | 1.1 | 14.5 | — | 4.0 | — | — | 1180–470 | 126–182 | 20 |
| | 3rd | 1.1 | 14.5 | — | 4.0 | — | 1½ | 1200–130 | 130–193 | 9 |
| | 4th | 1.1 | 14.5 | — | 4.0 | — | 2 | 1180–470 | 126–182 | 20 |
| VI | 1st | 1.1 | 15.4 | 60 | 4.0 | — | — | 740–240* | 145–198 | 50 |
| | 2nd | 1.1 | 15.4 | — | 4.0 | — | 1⅓ | 740–380 | 98–174 | 40 |
| VII | 1st | 0.97 | 14.5 | 60 | 4.0 | — | — | 1200–450 | 174–183 | 65 |
| | 2nd | 0.97 | 14.5 | — | 4.0 | — | 1⅓ | 1000–260 | 112–194 | 60 |
| VIII | A | 1.1 | 14.5 | 60 | — | — | — | 690–395 | 132–186 | 80 |
| | B | 1.1 | 15.4 | 60 | — | — | — | 770–140 | 120–186 | 60 |
| IX | — | 1.1 | 14.5 | 60 | 4.0 | 4.1 | — | 1200–490 | 168–185 | 50 |

*Hydrogen pressure dropped to 240, was repressured to 740 and thereafter dropped to 400 psig.

TABLE II

| Example No. | Run No. | Feed, Amount (ml) and Conversion Mole % | | Product | | | | | |
|---|---|---|---|---|---|---|---|---|---|
| | | | | $C_4^{=1}$ | n—C$_4$ | $C_5^{=1}$ | nC$_5$ | n—C$_6$ | n—C$_7$ |
| | | | | | | Mole % | | | |
| IV | 1st | $C_6^{=1}$ | 50 85.5 | — | — | — | — | 100 | — |
| | 2nd | $C_6^{=1}$ | 50 98.7 | — | — | — | — | 100 | — |
| | 3rd | $C_7^{=3}$ | 50 88.1 | — | — | — | — | — | 100 |
| | 4th |  | 45 84.5 | — | — | — | — | — | — |
| V | 1st | $C_7^{=3}$ | 30 95.0 | — | — | — | — | — | 100 |

TABLE II-continued

| Example No. | Run No. | Feed, Amount (ml) and Conversion Mole % | | Product $C_4^{=1}$ | n—$C_4$ | $C_5^{=1}$ | $nC_5$ | n—$C_6$ | n—$C_7$ |
|---|---|---|---|---|---|---|---|---|---|
| | 2nd |  | 38  97.6 | — | — | — | — | — | — |
| | 3rd | 1,3—$C_{5==}$ | 40  99.5 | — | — | 33.0 | 67.0 | — | — |
| | 4th |  | 40  100 | — | — | — | — | — | — |
| VI | 1st |  | 35  98.7 | — | — | — | — | — | — |
| | 2nd |  | 35  98.8 | — | — | — | — | — | — |
| VII | 1st | $C_6^{=2}$ | 50  85.0 | — | — | — | — | 100 | — |
| | 2nd | $C_4^{=1}$ | 22  95.0 | 70.5 | 29.5 | — | — | — | — |
| VIII | A | 1,3—$C_{5==}$ | 35  98.6 | — | — | 10.5 | 89.5 | — | — |
| | B |  | 40  99.8 | — | — | — | — | — | — |
| IX | — | $C_6^{=1}$ | 50  94.0 | — | — | — | — | 100 | — |

| Example No. | Run No. |  |  |  |  |  |  |
|---|---|---|---|---|---|---|---|
| IV | 1st | — | — | — | — | — | — |
| | 2nd | — | — | — | — | — | — |
| | 3rd | — | — | — | — | — | — |
| | 4th | 100 | — | — | — | — | — |
| V | 1st | — | — | — | — | — | — |
| | 2nd | 100 | — | — | — | — | — |
| | 3rd | — | — | — | — | — | — |
| | 4th | — | — | — | — | 4.5 | 95.5 |
| VI | 1st | — | 27.3 | 72.7 | — | — | — |
| | 2nd | — | — | — | 100 | — | — |
| VII | 1st | — | — | — | — | — | — |
| | 2nd | — | — | — | — | — | — |
| VIII | A | — | — | — | — | — | — |
| | B | — | — | — | — | 11.1 | 88.9 |
| IX | — | — | — | — | — | — | — |

EXAMPLE X

A 300 cc. stainless steel autoclave equipped with an air driven magnetic stirrer was used as a reactor. After 1.00 m. mole of nickel (II) acetylacetonate was weighed in the reactor along with 40 ml. toluene, the system was tightly closed and purged with hydrogen for about 20 minutes. A 32% triethylaluminum (10.03 m. moles) solution in toluene was injected into the reactor and the reactor was vigorously stirred under hydrogen pressure (200 psig.) for 10 minutes. During this period, the system was maintained at 110°–120°F. and no pressure change was observed. The total volume of toluene in the system was adjusted to 55 ml. As soon as 50 ml. of hexene-1 was introduced to the reactor from a blow-case, the reactor was pressured to 1000 psig. with hydrogen and then the hydrogen uptake was recorded. The dark reaction mixture containing some black precipitate was removed from the reactor after a 72 minute period. The catalyst in the discharged reaction mixture was destroyed with dilute HC1, and a colorless organic layer was isolated from an aqueous portion. The product was analyzed by means of GL-chromatographic and mass spectroscopic techniques. Details of the results are summarized in Table III and IV. About 85 mole % of the charged hexene-1 substrate was hydrogenated to n-hexane, and most of the unreacted hexene-1 was isomerized to hexene-2 (major isomer) and hexene-3 (minor isomer). In the mass spectroscopic analysis, mass 84 was calculated as hexene-1.

EXAMPLE XI

Extrudate pellets of Example III were added to the binary system containing nickel (II) acetylacetonate and triethylaluminum in toluene of Example X and this catalyst was used to hydrogenate hexene-1 under similar conditions to those employed in the previous example in order to study the effect of added extrudate. Both 0.99 m. moles of nickel (II) acetylacetonate and 5.0 g. extrudate of Example III were weighed in toluene in an autoclave. After the system was vigorously agitated while purging with hydrogen for 15 minutes, 21.14 m. moles of triethylaluminum was introduced to the system. Hydrogen was immediately added to keep the system 200 psig. and 120°F. for 10 minutes. The total toluene volume was 57 ml. Hexene-1 (50 ml.) was fed to the reactor, the system was pressured to 950 psig. with hydrogen, and hydrogen uptake was measured. A rapid pressure drop from 950 to 124 psig. was observed during a 60 minute period; this drop was much faster than that recorded for the previous binary system. By comparison, it is clear that the extrudate played a cocatalyst role in the binary catalyst system to hydrogenate hexene-1. A light brown reaction mixture with little precipitate was removed from the reactor after a 60 minute reaction period. Almost all of the precipitate formed by the interaction of the two components, nickel acetylacetonate and triethylaluminum, is believed to be supported on extrudate base. The resulting supported catalyst left inside of the reactor was saved for another run. Analysis of the product was carried out by a mass spectroscopic technique, and the results are listed in Table III. About 90 mole % of the hexene-1 substrate was hydrogenated in 60 minutes. The activity level of this catalyst can be easily raised by replacing extrudate with microspheroid particles. The resulting system will then become an effective slurry catalyst.

In the second run, 50 ml. of hexene-1 was introduced to the 1⅓ hour aged supported catalyst, which was left from the first run. Hydrogen was introduced to keep the system at 800 psig. and the initial pressure (800 psig.) dropped very rapidly to 105 psig. in 16 minutes. The system was again pressured with hydrogen to 600 psig., and the reaction was allowed to proceed for another 14 minutes. A clear reaction mixture was removed from the reactor and analyzed by a mass spectroscopic method. The charged hexene-1 was almost quantitatively (99 mole %) hydrogenated within 30 minutes. The results obtained in this run clearly demonstrate that the supported catalyst is the most active catalyst system for the hydrogenation of hexane-1.

EXAMPLE XII

A supported catalyst was prepared in a 150 ml. Elenmeyer flask from 0.98 moles of nickel (II) acetylacetonate, 19.04 m. moles triethylaluminum and 20.0 g. extrudate of Example III in 50 ml. toluene. The system was kept under a hydrogen atmosphere for about 2 hours. The extrudate turned quickly dark brown, leaving a slightly brown supernatant liquid. The resulting dark brown solid, which was isolated from the liquid phase, was washed with a 10 ml. portion of fresh toluene. The washed supported catalyst was transferred to a 300 cc. stainless steel bomb under a hydrogen atmosphere. Hexene-1 (55 ml.) was added to the supported catalyst and the system was pressured to 1200 psig. with hydrogen. Hydrogen uptake was so rapid that an unusually large pressure drop from the initial pressure (1200 to 100 psig.) occurred in a relatively short period (12 minutes). The system was agitated periodically, but the exothermicity of the reaction was so great that the system was maintained at 80°–165°F. A clear reaction mixture was discharged from the reactor after the reaction was allowed to proceed for 12 minutes. About 74 mole % of the charged hexene-1 was hydrogenated in this period. Two additional runs were made with the aged catalyst over a 20 hour period. Details of the results are listed in Table III.

In the second run, 60 ml. of hexene-1 was added to the 1⅓ hour aged catalyst. The system was maintained under 1200–400 psig. and 80°–100°F. for 29 minutes. About 72 mole % of the substrate was converted to n-hexane. The third run was tried with 50 ml. of hexene-1 feed over the 18¾ hour aged catalyst. About 61 mole % of hexene-1 was reacted in a 75 minute period. Both Examples XI and XII showed the feasibility of utilizing the supported binary catalyst as an effective fixed bed catalyst for the continuous hydrogenation of olefins.

The results obtained from Examples X, XI and XII indicate the following activity sequence for the hydrogenation of hexene-1 using the ternary nickel catalysts.

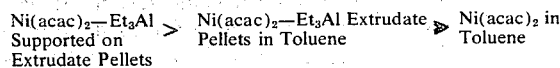

EXAMPLE XIII

The binary catalyst formed from nickel (II) acetylacetonate and ethylaluminum sesquichloride in toluene, known to be active for oligomerization and cooligomerization of olefins, was used in an attempt to hydrogenate hexene-1. The system was prepared from 1.02 m. moles of nickel (II) acetylacetonate and 13.81 of ethylaluminum sesquichloride in 60 ml. toluene in a 300 cc. autoclave. After 50 ml. of hexene-1 was charged to the reactor, the system was pressured with hydrogen up to 950 psig. No significant pressure drop was noted for 15 minutes. The pattern of pressure drop indicates that the system is not active for hydrogenation. Ethylaluminum sesquichloride was thus proved to be an ineffective component for the hydrogenation catalyst.

EXAMPLE XIV

Extrudate was added to the heterogeneous system prepared from 1.43 m. moles of nickel (II) acetylacetonate, 3.22 m. moles of triphenyl phosphine, and 35.28 m. moles of triethylaluminum in 45 ml. toluene in the autoclave. Hexene-1 (55 ml.) was introduced to the system and the system was pressured with hydrogen 3 times in the pressure range of 1160–540 psig. over a 60-minute period. A dark reaction mixture with a fair amount of black precipitate was discharged from the reactor leaving the resulting supported catalyst in the reactor. Four additional runs were made with the resulting supported catalyst over a 55hour period. The second and third runs were carried out with hexene-1 substrate, but the fourth and fifth runs were tried with cyclohexene and pentene-1, respectively. Results are tabulated in Tables III and IV. It appears that cyclohexene is a little more difficult to hydrogenate with the present catalyst system than hexene-1. A remarkable decrease in the conversion of pentene-1 in the fifth run is due to the aging of the catalyst rather than the intrinsic difficulty to hydrogenate a pentene-1 substrate.

EXAMPLE XV

A black supported catalyst was prepared from 1.74 m. moles of nickel (II) acetylacetonate, 2.97 m. moles triphenyl phosphine and 27.55 m. moles triethylaluminum with 15.0 g. extrudate of Example III. After the resulting black solid catalyst was washed with toluene a few times, it was transferred to a 150 or stainless steel bomb. Four consecutive runs were made with hexene-1 and heptene-3 substrates over about a 21-hour period. Details of the reactions are tabulated in Tables III and IV. The third run demonstrates that internal olefins such as heptene-3 are much more difficult to hydrogenate than the terminal olefins. The results obtained from Examples XIV and XV demonstrate the feasibility of utilizing the catalyst, Ni(acac)$_2$-Et$_3$Al-triphenyl phosphine supported on extrudate pellets of Example III as a fixed bed catalyst for the continuous hydrogenation of olefins.

EXAMPLE XVI

Two consecutive runs were made in this example. The first run was tried with the system containing 1.0 m. moles of nickel (II) actylacetonate, 7.18 m. moles of tributyl phosphine, 22.24 m. moles of triethylaluminum and 7.0 g. extrudate of Example III in 56 ml. toluene. Hydrogen-uptake was recorded with 50 ml. of hexene-1 substrate. A pressure drop from 950 psig. to 125 psig. was observed over a 45-minute period. A dark brown solution was discharged from the reactor. The second run was immediately started by introducing another portion (50 ml.) of hexene-1 and hydrogen to the solid catalyst left inside of the reactor. Hyddrogen-uptake observed with this system clearly indicates the cocatalytic effect of the extrudate pellets for hydrogen-uptake in these systems, and also demonstrates that the soluble catalytic species can be retained on the extrudate pellets. Details of the results are listed in Tables III and IV.

secutive runs were made intermittantly in this reactor with benzene derivatives over a 22-hour period.

In the first run, benzene (30 ml.) was fed to the freshly prepared catalyst in the reactor, and the system was pressured with hydrogen to 800 psig. three times to maintain the pressure of the reactor in the range of 800–180 psig. at 118°–288°F. over 42 minutes. The reaction product with a little amount of solid (debris of the catalyst pellets) was removed from the reactor, and was analyzed by means of mass spectroscopic techniques. About 56 mole % of the benzene substrate was hydrogenated to cyclohexane. Due to the characteristic nature of the catalyst pellets to absorb some of the liquid into the pellets, it was impossible to discharge the reaction liquid quantitatively from the reactor. Thus, the carry-over from preceding run(s) was unavoidable

TABLE III

| Ex. No. | Run No. | Ni(acac)$_2$ m moles | R$_3$P m moles | Et$_3$Al m moles | Toluene ml. | Support g. | Catalyst Aging Hours | Feed | Ml. | Pressure psig. | Temp. °F. | Time Min. | Convers. Mole % |
|---|---|---|---|---|---|---|---|---|---|---|---|---|---|
| X | — | 1.00 | — | 19.03 | 55 | — | — | C$_6^{=1}$ | 50 | 1000–141 | 124–147 | 72 | 85.3 |
| XI | 1st | 0.99 | — | 21.14 | 57 | 5.0 | — | C$_6^{=1}$ | 50 | 950–124 | 120–139 | 60 | 90.2 |
|  | 2nd | 0.99 | — | 21.14 | 0 | 5.0 | 1½ | C$_6^{=1}$ | 50 | 800–105 | 80–137 | 30 | 98.2 |
| XII | 1st | 0.98 | — | 19.04 | — | 20.0 | — | C$_6^{=1}$ | 55 | 1200–100 | 80–165 | 12 | 73.9 |
|  | 2nd | 0.98 | — | 19.04 | 0 | 20.0 | 1½ | C$_6^{=1}$ | 60 | 1200–400 | 80–160 | 29 | 71.7 |
|  | 3rd | 0.98 | — | 19.04 | 0 | 20.0 | 18¾ | C$_6^{=1}$ | 50 | 1000–500 | 80–120 | 75 | 60.8 |
| XIII | — | 1.02 | — | Et$_2$Al$_2$Cl$_3$ 13.81 | 60 | — | — | C$_6^{=1}$ | 50 | 950–850 | 119–125 | 25 | — |
| XIV | 1st | 1.43 | 3.22 | 35.28 | 45 | 5.0 | — | C$_6^{=1}$ | 55 | 1160–540 | 100–165 | 60 | 50.7 |
|  | 2nd | 1.43 | 3.22 | 35.28 | 0 | 5.0 | 1½ | C$_6^{=1}$ | 75 | 1000–500 | 85–159 | 30 | 62.0 |
|  | 3rd | 1.43 | 3.22 | 35.28 | 0 | 5.0 | 3½ | C$_6^{=1}$ | 80 | 1050–640 | 108–156 | 60 | 46.3 |
|  | 4th | 1.43 | 3.22 | 35.28 | 0 | 5.0 | 4¾ | ⌬ | 65 | 1050–900 | 112–176 | 220 | 16.3 |
|  | 5th | 1.43 | 3.22 | 35.28 | 0 | 5.0 | 51 | C$_5^{=1}$ | 50 | 860–930 | 85–150 | 240 | 8.8 |
| XV | 1st | 1.74 | 2.97 | 27.55 | 0 | 15.0 | — | C$_6^{=1}$ | 50 | 1200–400 | — | 40 | 84.2 |
|  | 2nd | 1.74 | 2.97 | 27.55 | 0 | 15.0 | 1 | C$_6^{=1}$ | 55 | 1200–300 | — | 48 | 71.1 |
|  | 3rd | 1.74 | 2.97 | 27.55 | 0 | 15.0 | 2 | C$_7^{=3}$ | 50 | 1200–1050 | 140 | 16 hr. | 16.8 |
|  | 4th | 1.74 | 2.97 7.48 | 27.55 | 0 | 15.0 | 18 | C$_6^{=1}$ | 50 | 1100–600 | 140–165 | 170 | 34.2 |
| XVI | 1st | 1.00 | 7.18 | 22.24 | 56 | 7.0 | — | C$_6^{=1}$ | 50 | 920–125 | 118–145 | 45 | 65.0 |
|  | 2nd | 1.00 | 7.18 | 22.24 | 0 | 7.0 | 1 | C$_6^{=1}$ | 50 | 920–225 | 132–146 | 36 | 88.2 |

TABLE IV

| | | GL-Chromotographic Analysis Product | | | | | |
|---|---|---|---|---|---|---|---|
| Example No. | Run No. | N—C$_6$ | C$_6^{=1}$ | Trans-C$_6^{=3}$ | Cis-C$_6^{=3}$ | Trans-C$_6^{=2}$ | Cis-C$_6^{=2}$ |
| X | — | 91.52 | 0.14 | 0.68 | 0.14 | 5.64 | 1.86 |
| XIV | 1st | 58.17 | 13.49 | 0.68 | 0.17 | 18.58 | 8.89 |
|  | 2nd | 81.92 | 1.02 | 0.54 | 0.08 | 12.39 | 4.02 |
| XV | 1st | 65.72 | 0.53 | 1.36 | 0.11 | 25.37 | 6.58 |
|  | 3rd | 51.20 | 35.34 | 0.18 | 0.04 | 7.78 | 5.40 |
| XVI | 1st | 89.75 | 0.66 | 0.56 | 0.15 | 5.92 | 2.55 |

EXAMPLE XVII

Black catalyst pellets were obtained from 1.0 m. mole of nickel (II) acetylacetonate, 21.1 m. moles of triisobutyl-aluminum and 4.5 g. extrudate pellets of Example III in toluene. The black pellets were separated from the liquid portion after the system was kept under a nitrogen atmosphere for an hour. The isolated pellets were washed with fresh portions of toluene until the wash solution became colorless. The resulting black pellets were transferred in the air to a 300 cc. autoclave. Most of the catalytic species formed from these components appeared to remain unsupported in the discharged liquid portion because of the limited amount of extrudate added to the system. Seven conthroughout these consecutive experiments.

The second run was started by feeding 40 ml. of benzene to the catalyst left from the first run. The reactor was pressured with hydrogen up to 800 psig., and was allowed to react by vigorous stirring at 234°–274°F. for a 20-minute period. During this period, the initial hydrogen pressure, 800 psig., dropped to 200 psig. A clear reaction mixture discharged from the reactor was composed of 30 mole % hydrogenated product (cyclohexane).

Similarly five more runs were made consecutively with toluene, o-xylene, mesitylene, p-xylene and styrene. Details of the reactons were listed in Tables V and VI. These substrates were hydrogenated to their hydrogenated products. The catalytic activity of the catalyst was maintained at almost an equal level even after the seven runs were completed over a 23-hour period. In the final run, styrene (40 ml.) was hydrogenated in 99 mole % yield to 74 mole % ethylbenzene and 26 mole % ethylcyclohexane within 22 minutes.

EXAMPLE XVIII

This run was made to study further the cocatalytic role the extrudate pellets played in the nickel acetylacetonate-triisobutylaluminum system. In Run A, 50 ml. of toluene was added to the system consisting of 0.39 m. mole of nickel (II) acetylacetonate, 6.7 m. moles of triisobutylaluminum as a solvent and the substrate (toluene). The system was pressured with hydrogen, and maintained at 224– for 120 minutes. The initial pressure, 700 psig., increased to 755 psig. as the temperature of the system increased. No significant hydrogenation of toluene was observed in this system.

In Run B, 4.5 g. extrudate pellets of Example III were added to the system having exactly the same catalyst composition as the one in Run A. The reactor was pressured with hydrogen to 700 psig. and was maintained at 158°–238°F. for a 50-minute period. A rapid pressure drop from the initial pressure, 700 psig., to 190 psig. was observed in this run. A clear reaction mixture was discharged from the reactor, and analyzed by means of mass spectroscopic techniques. About 14 mole % of the toluene substrate was converted to methylcyclohexane. The solid pellets resulting from this run were left inside of the reactor, and two more runs were made with $p$-xylene and benzonitrile substrates. $p$-xylene was hydrogenated to 1,4-dimethylcyclohexane, but benzonitrile did not undergo hydrogenation. Tables V and VI list details of the results obtained in these runs. The data obtained from Runs A and B clearly demonstrate the following: (1) the extrudate is a cocatalyst and an effective supporting base; and (2) benzene rings with electron withdrawing group(s) do not readily undergo hydrogenation under the conditions employed in this run. In a separate experiment with chlorobenzene, similar negative results were also obtained for the hydrogenation of this substrate.

EXAMPLE XIX

A black solid catalyst was prepared from 0.42 m. mole of nickel (II) acetylacetonate, 9.0 m. moles triisobutylaluminum, and 4.5 g. extrudate pellets of Example III. The isolated and washed catalyst pellets were transferred to an autoclave, and 1,2-diphenylacetylene (2.3 g. in 40 ml. n-heptane) was contacted with the catalyst. The reactor was pressured three times with hydrogen in order to maintain the pressure of the reactor in the range of 1200–895 psig. at 184°–319°F. for 70 minutes. A clear reaction mixture was removed from the reactor while it was warm. The product was collected after the n-heptane was distilled and analyzed by means of mass spectroscopy. The substrate was almost quantitatively hydrogenated to 1,2-dicyclohexylethane.

In the second run, durene (10 g. in 50 ml. n-heptane) was fed to the catalyst aged from the first run. The reactor was pressured three times with hydrogen to maintain the pressure of the reactor in the range of 1200–750 psig. at 225°–352°F. for 225 minutes. Mass spectroscopic analysis of the product obtained from the second run indicated that a significant amount of the substrate was hydrogenated to 1,2,4,5-tetramethylcyclohexane. Since no mass spectroscopic calibration data for the 1,2,4,5-tetramethylcyclohexane product was available, the exact yield of product is unknown. However, a significant parent mass peak for mass number, 140, which can be assumed to be derived from the 1,2,4,5-tetramethylcyclohexane product, was obtained.

The third run was attempted to determine if the catalyst still maintained any catalytic activity for the hydrogenation of benzene after two previous high temperature treatments. Benzene (35 ml.) was fed to the 5½ hour aged catalyst, and the system was pressured with hydrogen. The initial pressure, 1350 psig., dropped to 890 psig. during a 70-minute period. About 30 mole % of the benzene substrate was hydrogenated to cyclohexane. This indicates that the catalyst still maintains its catalytic activity at high temperature.

EXAMPLE XX

Both 0.97 m. moles of nickel (II) acetylacetonate and 6.9 m. moles of n-tributyl phosphine were weighed in toluene in a flask along with 15.0 g. extrudate of Example III. After the flask was purged with nitrogen, a triisobutyl aluminum solution in toluene was slowly added to the system. The color changed to orange and then to dark brown when the reducing agent was added. The brown pellets resulted when the system was allowed to react for 4 hours. The brown pellets were isolated from the dark liquid portion, washed a few times with fresh portions of toluene, and were transferred to a 500 cc. stainless steel bomb. After benzene (30 ml.) was fed to the bomb, a reaction was carried out under 1500–1200psig. hydrogen at 146°–155°F. for 160 minutes. About 11 mole % of benzene was converted to cyclohexane.

EXAMPLE XXI

Benzene (30 ml.) was allowed to react in a system consisting of 0.95 m. moles of nickel (II) acetylacetonate, 10.5 m. moles diisobutyl aluminum hydride and 15.0 g. extrudate of Example III in 55 ml. toluene. The system was under a mixed atmosphere of nitrogen (400 psig.) and hydrogen (900 psig.). The initial pressure, 1300 psig., dropped to 1100 psig. at 256°F. within 60 minutes, and the system was repressured with hydrogen to keep the pressure of the system in the range of 1550–750 psig. at 330°–356°F. for an additional 135-minute period. The substrate was converted in 22 mole % yield to cyclohexane.

EXAMPLE XXII

A solid black catalyst was prepared from 1.0 m. mole of nickel (II) acetylacetonate, 7.8 moles of diisobutyl aluminum hydride and 8.0 g. extrudate of Example III. The black pellets were isolated and washed with fresh portions of toluene. They were then transferred to a 500 cc. stainless steel bomb. Benzene (50 ml.) was fed to the catalyst, and the reactor was kept under 900–200 psig. hydrogen pressure in an oil bath set at 280°F. for 90 minutes. A clear reaction mixture discharged from the reactor was composed of 11 mole % of cyclohexane product.

EXAMPLE XXIII

A catalyst system was prepared from 0.98 m. mole of nickel (II) acetylacetonate and 12.1 m. moles of diisobutyl aluminum hydride in a mixed solvent of cyclohexane (40 ml.) and toluene (15 ml.). Benzene (20 ml.) was fed to the reactor, and the system was kept under 1500 psig. initial hydrogen pressure at 250°–270°F. for 4 hours. No significant pressure drop was noted during this period. This shows that the hydrogenation of benzene ring is very difficult with the binary system, nickel acetylacetonate-diisobutyl aluminum hydride, in the absence of the extrude of Example III.

TABLE V

| Ex. No. | Run No. | Ni(acac)$_2$ m. moles | (iBu)$_3$Al | (n—Bu)$_3$P | ⌬—CH$_3$ ml. | Support g. | Hour Catalyst Aged | Pressure psig. | Temp. °F. | Reaction Time Min. |
|---|---|---|---|---|---|---|---|---|---|---|
| XVII | 1st | 1.0 | 21.1 | — | — | 4.5 | — | 800–180* | 118–288 | 42 |
|  | 2nd | 1.0 | 21.1 | — | — | 4.5 | 1 | 800–200 | 234–274 | 20 |
|  | 3rd | 1.0 | 21.1 | — | — | 4.5 | 2½ | 800–180 | 240–276 | 22 |
|  | 4th | 1.0 | 21.1 | — | — | 4.5 | 4¾ | 800–170 | 220–278 | 30 |
|  | 5th | 1.0 | 21.1 | — | — | 4.5 | 20 | 800–700 | 240–290 | 60 |
|  | 6th | 1.0 | 21.1 | — | — | 4.5 | 21 | 800–190 | 234–286 | 25 |
|  | 7th | 1.0 | 21.1 | — | — | 4.5 | 21⅔ | 800–381* | 238–290 | 20 |
| XVIII | A — | 0.39 | 6.7 | — | 50 | — | — | 755–700 | 224–316 | 120 |
|  | 1st | 0.39 | 6.7 | — | 50 | 4.5 | — | 700–190 | 158–238 | 50 |
|  | B 2nd | 0.39 | 6.7 | — | — | 4.5 | 1 | 750–190 | 206–250 | 60 |
|  | 3rd | 0.39 | 6.7 | — | — | 4.5 | 2½ | 1200–1355 | 190–313 | 85 |
| XIX | 1st | 0.42 | 9.0 | — | n—C$_7$ 40 | 4.5 | — | 1200–895* | 184–319 | 70 |
|  | 2nd | 0.42 | 9.0 | — | — | 4.5 | 1 | 1200–750* | 225–352 | 225 |
|  | 3rd | 0.42 | 9.0 | — | — | 4.5 | 5½ | 1350–890 | 250–275 | 70 |
| XX |  | — | 0.97 | 39.0 | 6.9 | — | 15.0 | — | 1500–1200* | 146–155 | 60 |
| XXI |  | — | (iBu)$_2$AlH 10.5 | — | 55 | 15.0 | — | 1550–750** | 256–356 | 195 |
| XXII |  | — | 0.95 | — | — | 8/0 | — | 900–200 | 280 | 90 |
| XXIII |  | — | 1.0 7.8 0.98 12.1 | — | 15 toluene 40 cyclohexane |  |  |  |  |  |

*Pressured with H$_2$ more than one time.
**A mixed atmosphere (N$_2$ 400 psig. - H$_2$ 900 psig.).

TABLE VI

| Ex. No. | Run No. | Feed ml. | ⬡ | ⬡-C | ⬡(C,C) | ⬡(C,C,C) | ⬡(C,C,C,C,C,C) Mole % | ⌬-C | ⌬-C-C | ⬡-CH$_2$-CH$_2$-⬡ | Conversion Mole % |
|---|---|---|---|---|---|---|---|---|---|---|---|
| XVII | 1st | ⬡ 30 | 100 |  |  |  |  |  |  |  | 46.2 |
|  | 2nd | ⬡-C 40 | 100 |  |  |  |  |  |  |  | 30.1 |
|  | 3rd | ⬡-C 40 |  | 100 |  |  |  |  |  |  | 14.3 |
|  | 4th | ⬡(C,C) 40 |  | 100 |  |  |  |  |  |  | 15.6 |
|  | 5th | ⬡(C,C,C) 40 |  |  |  | 100 |  |  |  |  | 51.5 |
|  | 6th | ⬡(C,C) 30 |  | 100 |  |  |  |  |  |  | 17.4 |
|  | 7th | ⬡-C=C 40 |  |  |  |  |  | 74 | 26 |  | 99 |
| XVIII | A — | ⬡-C 50 | No significant reaction |  |  |  |  |  |  |  | — |
|  | B 1st | ⬡-C 50 | 100 |  |  |  |  |  |  |  | 14.3 |
|  | 2nd | ⬡(C,C) 40 | 100 |  |  |  |  |  |  |  | 14.2 |

TABLE VI-continued

| Ex. No. | Run No. | Feed | ml. |  |  |  |  Mole % |  C—C  |  C—C  |  | —CH₂—CH₂— | Conversion Mole % |
|---|---|---|---|---|---|---|---|---|---|---|---|---|
| | 3rd |  (φCN) | 40 | No significant reaction | | | | | | | | — |
| XIX | 1st | φC≡Cφ | 2.3 g | — | | | | 100 | | | | 100 |
| | 2nd |  | 10 g. | | | | 100 | | | | | — |
| | 3rd |  | 35 | 100 | | | | | | | | 30.0 |
| XX | — |  | 30 | 100 | | | | | | | | 10.8 |
| XXI | — | ⌬ | 30 | 100 | | | | | | | | 21.0 |
| XXII | — | ⌬ | 50 | 100 | | | | | | | | 11.0 |
| XXIII | — |  | 20 | No significant reaction | | | | | | | | — |

Examples XXIV and XXV illustrate the preparation of iron and cobalt catalysts useful in this invention.

EXAMPLE XXIV

Fifteen grams of silica-alumina support having a separate aluminum phase and prepared according to Example III, impregnated with ferric acetylacetonate (2.70 m. moles), was introduced into a toluene solution of bis(diphenylphosphino)ethane (1.61 m. moles) in 40 ml. toluene under nitrogen atmosphere. When this mixture was allowed to react for 2–3 hours, the silica-alumina pellets turned dark due to the formation of a diphosphine complex of iron (III). A toluene solution (25%) of triisobutylaluminum (37 m. moles) was injected into the diphosphine complex system. The pellets changed to dark greenish-brown after the system was allowed to react for two hours. A light supernatant liquid was separated from the dark greenish-brown pellets by means of a syringe needle. The supported catalyst was washed three times until the wash solution became clear.

EXAMPLE XXV

A supported catalyst was prepared from 1.16 m. moles anhydrous cobalt chloride, 1.13 m. moles bis(diphenylphosphino)-ethane, 32.4 m. moles triisobutylaluminum and 10 g. of silica-alumina support prepared according to Example III. Fresh silica-alumina (10 g.) was added to the dark green mixture of cobalt chloride and bis(diphenylphosphino)ethane in 30 ml. toluene. After 32 m. moles of triisobutylaluminum solution in toluene was injected to the system, the reaction was allowed to proceed for about an hour. The pellets became darker leaving a lighter supernatant liquid. The liquid was separated from the dark pellets by means of a syringe needle. The dark supported catalyst pellets were washed twice until the wash solution became clear.

An iron or cobalt catalyst containing only the metal source and the reducing agent may be prepared as in Examples XXIV and XXV by treating the support initially with only the metal source in a solvent (either toluene or benzene) followed by treatment with the designated reducing agents. Additionally, a solid catalyst may be prepared by adding the silica support material to the dark mixture of an iron or cobalt source and the organometallic reducing agent in an inert solvent.

Further preparations and utilization of the iron and cobalt catalysts described herein in hydrogenation reactions are illustrated by the following Examples. Details of reaction conditions, catalyst composition and product distribution are present in these Examples and are listed in Tables VII through X.

EXAMPLE XXVI

Run A was carried out in a homogeneous solution consisting of 1.3 m. moles of iron (III) acetylacetonate, 11.3 m. moles of triethylaluminum and 1.0 m. mole of bis(diphenylphosphine)ethane in 55 ml. toluene, with 65 ml. of the hexene-1 substrate in a 300 cc. autoclave. The charged substrate was allowed to react under 1200–700 psig. hydrogen pressure and at 112°–175°F. for a 100-minute period. The pressure of the reactor was maintained in a range of 1200–700 psig. by introducing fresh hydrogen intermittently to the reactor. A black reaction mixture removed form the reactor was treated with dilute HCl, and an organic layer was separated from the aqueous portion. The product was analyzed by mass spectroscopy. About 45 mole % of the substrate was hydrogenated to n-hexane in this run.

Run B was tried to investigate the effect of the support of Example III on the catalytic hydrogenation of hexene-1. A supported catalyst was prepared by keeping the catalyst of Run A and 10.0 grams of extrudate of Example III in toluene solvent under a nitrogen atmosphere. The supported catalyst was separated from the clear supernatant liquid, washed with fresh portions of toluene and the resultant supported catalyst transferred to a 300 cc. stainless steel bomb. Hexene-1 (50 ml.) was fed to the catalyst and the reactor was pressured with hydrogen to 950 psig. The exothermicity of the reaction was such that the bomb was maintained slightly warm for about 30 minutes. The hexene-1 substrate charged was almost quantitatively (98 mole %) hydrogenated to n-hexane. Although the reaction system was kept for a week, the reaction was completed within 30 minutes as evidenced by the fact that the exothermicity of the reaction ceased after this period.

In Run C 60 ml. of pentene-1 was hydrogenated in the catalyst system consisting of 1.2 m. moles if iron (III) acetylacetonate, 1.0 m. mole of bis(diphenylphosphino)ethane and 11.1 m. moles triisobutyl aluminum in 50 ml. toluene. The reaction was allowed to proceed under an initial hydrogen pressure of 1100 psig. at 144°–180°F. for a 45-minute period. The initial hydrogen pressure of the reactor dropped to 630 psig. during this period, and 76.2 mole % of the pentene-1 substrate was hydrogenated.

In Run D, three consecutive runs were made. The first run was tried in the presence of 10.0 of the support of Example III under the same conditions as in Run C. Pentene-1 (60 ml.) was hydrogenated for a 20-minute period. The initial hydrogen pressure, 1100 psig., dropped to 320 psig. during this period. The rate of hydrogen uptake observed in this run was much faster than that in Run C. 80 mole % of the substrate charged was converted to n-pentane. The second run was immediately started by injecting 70 ml. of pentene-1 to the solid catalyst left in the reactor. The pentene-1 substrate was hydrogenated to n-pentane in about 60 mole % yield under 1100–700 psig. and 138°–173°F. within a 20-minute period. The third run was made with octene-2, but only slight activity was noticed. Details of the results obtained in these runs are tabulated in Tables VII and VIII. The results obtained from Run C and the first and second runs in Run D clearly demonstrate that the support of Example III is a cocatalyst. The third run suggests that the present catalyst system is capable of hydrogenating internal olefins only under more severe reaction conditions such as increased temperature, pressure or reaction time.

EXAMPLE XXVII

After 1.1 m. moles of iron (III) acetylacetonate, 1.1 m. moles of bis(diphenylphosphino)ethane, and 4.0 g. support pellets of Example III were weighed in a 300 cc. autoclave along with toluene, the system was tightly closed and purged with hydrogen for about 15 minutes. A 25% diisobutyl aluminum hydride (15.3 m. moles) solution was injected to the reactor and the reactor was vigorously stirred under hydrogen pressure (46 psig.) at 120°–160°F. for 10 minutes. The total volume of toluene in the system was adjusted to 60 ml. As soon as 35 ml. of cyclohexene was introduced to the reactor, the reactor was pressured with hydrogen to 1200 psig. and then the hydrogen-uptake was recorded. A pressure drop from the initial pressure, 1200 psig., to 600 psig. was observed during a 100 minute period. The temperature of the reactor was maintained in the range of 160°–183°F. A clear greenish reaction mixture was removed from the reactor, and the supported catalyst left inside of the autoclave was saved for the three additional runs. The cyclohexene charged in the first run was hydrogenated in 85 mole % yield to cyclohexane.

The second run was started by feeding 33 ml. of 1,3-pentadiene to the 2 hour aged catalyst. The reactor was again pressured with hydrogen to 1200 psig., and the system was allowed to react at 116°–184°F. for 95 minutes. About 98 mole % of the pentadiene substrate was hydrogenated to 78 mole % pentenes and 22 mole % of pentane.

The third and fourth runs were made with 40 ml. hexene-2 and 37 ml. 4-vinyl-l-cyclohexene, respectively. Only slight reaction was observed in these two runs. This may probably be attributed to the aging of the supported catalyst.

EXAMPLE XXVIII

The catalyst system containing 1.3 m. moles of iron (III) acetylacetonate and 5.5 m. moles of triethylaluminum was supported on 15.0 g. of extrudate of Example III, and these components were kept under a nitrogen atmosphere for about an hour. Hexene-1 (50 ml.) was fed to the catalyst, and hydrogen was immediately introduced to keep the system under 1050 psig. The system was allowed to react at about 150°F. for a 40-minute period. During this period, the initial hydrogen-pressure of 1050 psig. dropped to 345 psig. A slightly cloudy brown mixture was discharged from the reactor. The hexene-1 substrate was almost quantitatively (~99 mole %) hydrogenated.

The second run was made by injecting 50 ml. pentene-1 to the 1 hour aged catalyst. Reaction proceeded at about 150°F. for about 56 minutes. A rather rapid pressure drop from 1040 psig. to 110 psig. was observed during this period, and the pentene-1 charged in this run was converted in a ~99 mole % to n-pentane.

EXAMPLE XXIX

Pentene-1 (27 ml.) was introduced to a system containing 1.1 m. moles of iron (III) acetylacetonate, 16.2 m. moles of diisobutylaluminum hydride and 4.0 g. of extrudate pellets of Example III in 35 ml. toluene. Introduction of hydrogen to the catalyst in a reactor immediately followed to keep the system under 1200 psig. pressure. The system was maintained at 157°–172°F. for a 60-minute period, and hydrogen-uptake from 1200 psig. to 760 psig. was noticed during this reaction period. The dark reaction mixture discharged from the reactor was treated with dilute HCl, and an organic portion was isolated. About 90 mole % of the pentene-1 substrate was hydrogenated.

In the second run, 40 ml. of heptene-3 was fed to the 3 hour aged solid catalyst at 1200–1070 psig. and 128°–189°F. and reacted for 87 minutes. The system was kept under the same conditions for an additional 33-minute period. No further pressure change in the system was observed during this duration. About 45 mole % of the heptene-3 was hydrogenated to n-heptane. It seems that internal olefins are more difficult to hydrogenate than terminal olefins with the present catalyst system.

EXAMPLE XXX

Various soluble catalyst systems were prepared with different electron donor ligands such as triphenyl and tributyl phosphine and dipyridyl.

In Run A, a solution consisting of 1.1 m. moles of iron (III) acetylacetonate, 2.0 m. moles of triphenyl phosphine and 11.8 m. moles of triisobutylaluminum in 60 ml. toluene, was investigated for the hydrogenation of hexene-1 under reaction conditions similar to those employed in previous Examples. Hexene-1 (33 ml.) was kept in this solution at 1200–780 psig. hydrogen pressure at 171°–188°F. for 90 minutes. A black-brown solution with no apparent solid material was removed from the reactor. The hexene-1 substrate was reacted in 84 mole % yield.

In Run B, 40 ml. of hexene-1 was fed to a system containing 1.1 m. moles of iron (III) acetylacetonate, 4.2 m. moles of tributylphosphine, and 15.1 m. moles of diisobutylaluminum hydride in 60 ml. toluene and kept in this system under 1200–710 psig. at 183°–199°F. for an 87-minute period. About 88 mole % of the hexene-1 substrate was converted to n-hexane.

Run C was made by adding 40 ml. of hexene-1 to a catalyst solution prepared from 1.1 m. moles of iron (III) acetylacetonate, 2.1 m. moles of dipyridyl and 14.5 m. moles of diisobutyl aluminum hydride in 60 ml. toluene. Hydrogenation of the substrate was continued under 1200–725 psig. and at 174°–206°F. for a 48-minute period. Under these conditions hexene-1 was substantially hydrogenated to n-hexane.

These three runs clearly demonstrate distinctive ligand effects in the soluble ternary system on the catalytic activity for hydrogenation of the hexene-1 substrate.

EXAMPLE XXXI

A supported catalyst was prepared from 1.2 m. moles cobalt (III) acetylacetonate, 12.3 m. moles of triethylaluminum and 15.0 g. extrudate of Example III. The supported catalyst was separated from the clear mother liquor, washed with fresh portions of toluene, and kept under nitrogen in an Erlenmeyer flask for 2 hours. The resultant catalyst was transferred to a 300 cc. stainless steel bomb, and five consecutive runs were made with hexene-1, cyclohexene, and 2-methyl-butene-1 over a 74 hour period. Results obtained in these runs are listed in Tables IX and X.

In the first run, 50 ml. of hexene-1 was allowed to react at 120°–150°F. for 41 minutes. A rapid hydrogen uptake from 1040 to 365 psig. was observed during this period. About 98 mole % of hexene-1 was converted to n-hexane. The second run was immediately followed by introducing 55 ml. pentane-1 to the reactor. Reaction proceeded at 120°–155°F. for 52 minutes. During this period the initial hydrogen pressure of 1060 psig. dropped to 150 psig. The pentene-1 substrate was hydrogenated in 99 mole % yield to n-pentane. The third run was made with 53 ml. cyclohexene. The cyclohexene substrate was quantitatively hydrogenated to cyclohexane in 60 minutes.

The fourth run was carried out by feeding 50 ml. of hexene-1 to the 68 hour aged catalyst. The system was allowed to react at 120°–145°F. of 65 minutes. The pressure drop from 1040 to 410 psig. was observed during this period. The hexene-1 substrate was hydrogenated in 34 mole % yield to hexane. The fifth run was made with 40 ml. of 2-methylbutene-1 but only slight catalytic hydrogenation was noticed. It appears that the 2-methyl-butene-1 substrate may be difficult to hydrogenate due to steric hindrance caused by branching on a carbon atom of the carbon-to-carbon unsaturated bond. Also, the difficulty may partially be explained by the aging of the catalyst herein.

EXAMPLE XXXII

A red supported catalyst was prepared from 1.1 m. moles of cobalt (III) acetylacetonate and 1.84 m. moles of triethylaluminum along with 10.0 g. of extrudate of Example III. When these components were kept under a nitrogen atmosphere for about an hour, the extrudate became green at the initial stage of reaction. The red solid catalyst was separated from the supernatant liquid, washed with fresh portions of toleune and the resulting catalyst transferred to a 300 cc. stainless steel bomb; 50 ml. of hexene-1 was fed to the catalyst. Almost all of the hexene-1 substrate (~99 mole %) was converted to n-hexane after the system was kept under 970–730 psig. of hydrogen and at 90°–120°F. for 60 minutes.

EXAMPLE XXXIII

A catalyst solution consisting of 1.0 m. mole of cobalt (III) acetylacetonate, 1.0 m. mole of bis(diphenylphosphino)ethane, and 18.2 m. moles of triethyl aluminum in 55 ml. toluene was investigated for the hydrogenation of 50 ml. hexene-1. Reaction proceeded under 720–390 psig. and at 130°–136°F. for 75 minutes. The hexene-1 substrate was hydrogenated to n-hexane in only 27 mole % yield.

EXAMPLE XXXIV

Hexene-1 (60 ml.) was fed to the catalyst solution prepared from 1.3 m. moles of cobalt (II) acetylacetonate, 3.2 m. moles of triphenylphosphine, and 35.5 m. moles of triethylaluminum om 52 ml. toluene. The reactor was pressured to 1130 psig. with hydrogen, and maintained at 80°–152°F. for 90 minutes. During this period, only 36 mole % of the hexene-1 charged was hydrogenated to n-hexane.

TABLE VII

| | | Catalyst Composition | | | | | Reaction Condition | | | |
|---|---|---|---|---|---|---|---|---|---|---|
| Example No. | Run No. | Fe(acac)$_3$ | E.D. m. moles | Organo Al Compound | ⌬CH$_3$ ml. | Support g. | Aging Time (Hours) | H$_2$ Pressure psig. | Temp. °F. | Reaction Time Min. |
| XXVI | A | 1.3 | ($\phi_2$P)$_2$C$_2$H$_4$ 1.0 | Et$_3$Al 11.3 | 55 | — | — | 1200–700 | 112–175 | 100 |
| | B | 1.1 | 1.0 | 8.1 | — | 10.0 | — | 950–280 | 80–120 | 30 |
| | C | 1.2 | $\phi_2$P$_2$C$_2$H$_4$P$\phi_2$ 1.0 | (iBu)$_3$Al 11.1 | 50 | — | — | 1100–630 | 144–180 | 45 |
| | D | 1st 1.2 | 1.0 | 11.1 | 50 | 4.0 | — | 1100–320 | 150–180 | 20 |

TABLE VII-continued

| | | Catalyst Composition | | | | | | Reaction Condition | | | |
|---|---|---|---|---|---|---|---|---|---|---|---|
| Example No. | Run No. | $Fe(acac)_3$ | E.D. m. moles | Organo Al Compound | ml. | $CH_3$ | Support g. | Aging Time (Hours) | $H_2$ Pressure psig. | Temp. °F. | Reaction Time Min. |
| | 2nd | 1.2 | 1.0 | $(iBu)_2AlH$ 11.1 | — | | 4.0 | ½ | 1100–170 | 128–173 | 20 |
| | 3rd | 1.2 | 1.0 | $(iBu)_2AlH$ 11.1 | — | | 4.0 | 1 | 1080–1020 | 138–170 | 18 |
| XXVII | 1st | 1.1 | 1.1 | $(iBu)_2AlH$ 15.3 | 60 | | 4.0 | — | 1200–600 | 160–183 | 100 |
| | 2nd | 1.1 | 1.1 | $(iBu)_2AlH$ 15.3 | — | | 4.0 | 2 | 1200–500 | 116–184 | 95 |
| | 3rd | 1.1 | 1.1 | $(iBu)_2AlH$ 15.3 | — | | 4.0 | 5½ | 1200 | 178–186 | 25 |
| | 4th | 1.1 | 1.1 | $(iBu)_2AlH$ 15.3 | — | | 4.0 | 6 | 1200 | 173–180 | 30 |
| XXVIII | 1st | 1.3 | — | $Et_3Al$ 5.5 | — | | 15.0 | — | 1050–345 | 150 | 40 |
| | 2nd | 1.3 | — | 5.5 | — | | 15.0 | 1 | 1040–110 | 150 | 56 |
| XXIX | 1st | 1.1 | — | $(iBu)_2AlH$ 16.2 | 55 | | 4.0 | — | 1200–760 | 157–172 | 60 |
| | 2nd | 1.1 | — | $(iBu)_2AlH$ 16.2 | — | | 4.0 | 3 | 1200–1070 | 128–189 | 87 |
| XXX | A | 1.1 | $\phi_3P$ 2.9 | $(iBu)_3Al$ 11.8 | 60 | | — | — | 1200–780 | 171–188 | 90 |
| | B | 1.1 | $Bu_3P$ 4.2 | $(iBu)_2AlH$ 15.1 | 60 | | — | — | 1200–710 | 183–199 | 87 |
| | C | 1.1 | dipy 2.1 | 14.5 | 60 | | — | — | 1200–725 | 174–206 | 48 |

TABLE VIII

| | | | | Product | | | | | Conversion |
|---|---|---|---|---|---|---|---|---|---|
| Example No. | Run No. | Feed | ml. | $C_5^=$ | $C_5$ | $n-C_6$ | $CyC_6$ | $C_7$ | Mole % |
| | | | | mole percent | | | | | |
| XXVI | A | $C_6^{=1}$ | 65 | — | — | 100 | — | — | 44.2 |
| | B | $C_6^{=1}$ | 50 | — | — | 100 | — | — | 98.0 |
| | C | $C_5^{=1}$ | 60 | — | — | 100 | — | — | 76.2 |
| | D 1st | $C_5^{=1}$ | 60 | — | — | 100 | — | — | 79.5 |
| | 2nd | $C_5^{=1}$ | 70 | — | — | 100 | — | — | 68.7 |
| | 3rd | $C_8^{=2}$ | 60 | slight reaction | | | | | |
| XXVII | 1st | $CyC_6^=$ | 35 | — | — | — | 100 | — | 84.6 |
| | 2nd | $1,3-C_5^{==}$ | 33 | 78.2 | 21.8 | — | — | — | 97.8 |
| | 3rd | $C_6^{=2}$ | 40 | slight reaction | | | | | — |
| | 4th | (styrene-type) | 37 | slight reaction | | | | | — |
| XXVIII | 1st | $C_6^{=1}$ | 50 | — | — | 100 | — | — | 98.7 |
| | 2nd | $C_5^{=1}$ | 50 | — | 100 | — | — | — | 98.7 |
| XXIX | 1st | $C_5^{=1}$ | 37 | 100 | — | — | — | — | 98.8 |
| | 2nd | $C_7^{=3}$ | 40 | — | — | — | — | 100 | 44.5 |
| XXX | A | $C_6^{=1}$ | 33 | — | — | 100 | — | — | 83.7 |
| | B | $C_6^{=1}$ | 40 | — | — | 100 | — | — | 87.8 |
| | C | $C_6^{=1}$ | 40 | — | — | 100 | — | — | 100 |

TABLE IX

| | | Catalyst Composition | | | | | | | Reaction Conditions | | |
|---|---|---|---|---|---|---|---|---|---|---|---|
| Example No. | Run No. | $Co(acac)_3$ | E.D. m. moles | $Et_3Al$ | (benzene) ml. | $CH_3$ | Support g. | Aging Period (Hours) | $H_2$ Pressure psig. | Temp. °F. | Reaction Time Min. |
| XXXI | 1st | 1.2 | — | 12.3 | — | | 15.0 | — | 1040–365 | 120–150 | 41 |
| | 2nd | 1.2 | — | 12.3 | — | | 15.0 | 1 | 1060–150 | 120–155 | 52 |
| | 3rd | 1.2 | — | 12.3 | — | | 15.0 | 2½ | 1060–640 | 120–145 | 60 |
| | 4th | 1.2 | — | 12.3 | — | | 15.0 | 68 | 1040–410 | 120–145 | 65 |
| | 5th | 1.2 | — | 12.3 | — | | 15.0 | 73 | 1000–960 | 130 | 60 |
| XXXII | — | 1.1 | — | 18.4 | — | | 10.0 | — | 970–730 | 90–120 | 60 |
| XXXIII | — | 1.0 | $(\phi_2P)_2C_2H_4$ 1.0 | 18.2 | 55 | | — | — | 720–390 | 130–136 | 75 |
| XXXIV | | $Co(acac)_2$ 1.3 | $\phi_3P$ 3.2 | 35.5 | 52 | | — | — | 1130–710 | 80–152 | 90 |

TABLE X

| | | | | Product | | | | | Conversion |
|---|---|---|---|---|---|---|---|---|---|
| Example No. | Run No. | Feed | ml. | $C_5^=$ | $C_5$ | $n-C_6$ | $CyC_6$ | $C_7$ | mole % |
| | | | | mole percent | | | | | |
| XXXI | 1st | $C_6^{=1}$ | 50 | — | — | 100 | — | — | 97.9 |

TABLE X-continued

| Example No. | Run No. | Feed | ml. | Product C$_5^=$ | C$_5$ | n—C$_6$ | CyC$_6$ | C$_7$ | Conversion mole % |
|---|---|---|---|---|---|---|---|---|---|
|  | 2nd | C$_5^{=1}$ | 55 | 100 | — | — | — | — | 98.7 |
|  | 3rd | CyC$_6^{=1}$ | 53 | — | — | — | 100 | — | 100 |
|  | 4th | C$_6^{=1}$ | 50 | — | — | 100 | — | — | 34.3 |
|  | 5th | 2M-C$_4^{=1}$ | 40 | slight reaction | | | | | |
| XXXII | — | C$_5^{=1}$ | 50 | — | — | 100 | — | — | 99.0 |
| XXXIII | — | C$_6^{=1}$ | 50 | — | — | 100 | — | — | 27.4 |
| XXXIV | — | C$_6^{=1}$ | 50 | — | — | 100 | — | — | 36.3 |

As is illustrated by the various examples set forth in Tables II, III and IV, the process of this invention provides improved hydrogenation activity. Of particular importance is the fact that the catalyst can be reused additional times while still providing hydrogenation activity. As set forth in Example IV, various hydrogenateable materials were converted to the corresponding hydrogenated product in four successive runs, e.g. a second run utilizing the catalyst from the first run provided a hydrogenation conversion of 99 mole % based upon the feed. This data establishes the ability to reuse the catalyst and indicates the high degree of activity and stability of the catalyst in a hydrogenation process. In addition, Example IV further demonstrates the outstanding yield of hydrogenated product utilizing a catalyst which was prepared at a temperature of 130° to 136°F. over a 10-minute period using the mole ratio of reducing agent to metal of 14.5:1. The catalyst, when utilized for the first time, produced an 86% conversion of the olefin feed. Of further additional importance is the fact that a catalyst of this invention (Example XVII) after exposure to air, is not deactivated. Thus, the hydrogenation catalyst of this invention exhibits enhanced hydrogenation activity when prepared within temperature ranges of from about −20°F. to about 150°F. at mole ratios of reducing agent (B) to metal (A) within the range of about 5 to 20:1. In addition, the catalyst and process of this invention provide improved hydrogenation activity utilizing a silica-based and inorganic oxide support. This support, in combination with metal (A) and reducing agent (B), provides a total catalyst with improved hydrogenation activity.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. In a process for the catalytic hydrogenation of hydrogenateable material having carbon-to-carbon unsaturation wherein said material is contacted under hydrogenation conditions with molecular hydrogen in the presence of a catalyst, the improvement which comprises contacting said hydrogenateable material with hydrogen at a temperature of from about −40° to about 300°F. in the presence of a catalyst comprising a minor catalytically effective amount of a complex of
A. a metal selected from iron, cobalt, nickel and mixtures thereof, and
B. an organometallic reducing agent of the formula M(R)$_n$ wherein M is a Group IA, IIA, IIB, IIIA or IVA metal, n is 1 to 4 and satisfies the valence of M, and each R is selected from hydrogen and hydrocarbyl, provided at least one R is hydrocarbyl; supported on a major portion of
C. an acidic, solid, silica-based and inorganic oxide support wherein the mole ratio of (B) to (A) is from about 5 to 20:1 and the complex is prepared by the interaction of (A) and (B) at a temperature of from about −20°F. to about 150°F.

2. A process of claim 1 wherein the weight ratio of (C) to (A) is about 2 to 2000:1.

3. A process of claim 1 containing as a further constituent (D) an electron donor ligand of a Group VA element wherein the molar ratio of (D) to (A) is from about 0.5 to 15:1.

4. A process of claim 3 wherein (D) is a monotertiary phosphine of the formula P(R′)$_3$ wherein R′ is hydrocarbyl of 1 to about 20 carbon atoms.

5. A process of claim 1 wherein the reducing agent (B) has the formula Al(R)$_3$, and each R is selected from hydrogen or alkyl of 2 to about 8 carbon atoms and at least two R groups are alkyl.

6. A process of claim 5 wherein the weight ratio of (C) to (A) is about 2 to 2000:1, and the complex of (A) and (B) is prepared at a temperature of from about 20° to 100°F., and (A) is a nickel compound.

7. A process of claim 6 containing as a further constituent (D) an electron donor ligand of a Group VA element wherein the molar ratio of (D) to (A) is about 0.5 to 15:1.

8. A process of claim 7 wherein (D) is a monotertiary phosphine of the formula P(R′)$_3$ wherein R′ is hydrocarbyl of 1 to about 20 carbon atoms.

9. A process of claim 1 wherein the complex of (A) and (B) is prepared at a temperature of from about 20° to 100°F.

10. A process of claim 9 wherein the weight ratio of (C) to (A) is about 5 to 300:1.

11. A process of claim 1 wherein the metal (A) is present as the acetylacetonate.

12. A process of claim 11 wherein the metal (A) is nickel.

13. A process of claim 1 wherein the metal (A) is supplied as the acetylacetonate; the organometallic reducing agent is of the formula Al(R)$_3$ wherein each R is selected from hydrogen or alkyl of 2 to about 8 carbon atoms and at least two R groups are alkyl, and the acidic, solid silica-based and inorganic oxide support is a calcined silica-alumina and the carbon-to-carbon unsaturation is ethylenic or acetylenic.

14. A process of claim 13 containing as a further constituent (D) an electron donor ligand of a Group VA element wherein the ligand is a monotertiary phosphine of the formula P(R′)$_3$ wherein R′ is hydrocarbyl of about 1 to 20 carbon atoms and the molar ratio of (D) to (A) is about 1 to 5:1.

15. A process of claim 13 wherein the support is comprised of about 45 to 95 weight % amorphous silica-alumina and about 5 to 55 weight % of a separate alumina phase, the total alumina content of said supprt being about 20 to 70 weight %.

16. A process of claim 15 wherein said alumina results from the calcination of a member selected from the group consisting of amorphous hydrous alumina, alumina monohydrate and mixtures thereof.

17. A process of claim 3 wherein the support is comprised of about 45 to 95 weight % amorphous silica-alumina and about 5 to 55 weight % of a separate alumina phase, the total alumina content of said support being about 20 to 70 weight %.

18. A process of claim 17 wherein said alumina results from the calcination of a member selected from the group consisting of amorphous hydrous alumina, alumina monohydrate and mixtures thereof.

19. A process of claim 5 wherein the support is comprised of about 45 to 95 weight % amorphous silica-alumina and about 5 to 55 weight % of a separate alumina phase, the total alumina content of said support being about 20 to 70 weight %, and (A) is a nickel compound.

20. A process of claim 19 wherein said alumina results from the calcination of a member selected from the group consisting of amorphous hydrous alumina, alumina monohydrate and mixtures thereof, and the carbon-to-carbon unsaturation is ethylenic or acetylenic.

21. A process of claim 12 wherein the support is comprised of about 45 to 95 weight % amorphous silica-alumina and about 5 to 55 weight % of a separate alumina phase, the total alumina content of said support being about 20 to 70 weight %.

22. A process of claim 21 wherein said alumina results from the calcination of a member selected from the group consisting of amorphous hydrous alumina, alumina monohydrate and mixtures thereof, and the carbon-to-carbon unsaturation is ethylenic or acetylenic.

* * * * *

UNITED STATES PATENT OFFICE
CERTIFICATE OF CORRECTION

PATENT NO. : 3,917,737
DATED : November 4, 1975
INVENTOR(S) : Jin Sun Yoo

It is certified that error appears in the above-identified patent and that said Letters Patent are hereby corrected as shown below:

Column 34, lines 15 and 16, delete "an acidic, solid-based and inorganic oxide support" and insert in place thereof -- a calcined silica-alumina support having a separate, additional alumina phase --.

Column 34, lines 57, 58 and 59, delete "and the acidic, solid silica-based and inorganic oxide support is a calcined silica-alumina"

Signed and Sealed this twenty-fourth Day of February 1976

[SEAL]

Attest:

RUTH C. MASON
Attesting Officer

C. MARSHALL DANN
Commissioner of Patents and Trademarks